United States Patent
Torvinen et al.

(10) Patent No.: US 10,158,993 B2
(45) Date of Patent: Dec. 18, 2018

(54) WIRELESS COMMUNICATIONS

(71) Applicant: Telefonaktiebolaget LM Ericsson (publ), Stockholm (SE)

(72) Inventors: Vesa Torvinen, Turku (FI); Vesa Lehtovirta, Jorvas (FI); Katharina Pfeffer, Graz (AT); Patrik Teppo, Jorvas (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 15/560,020

(22) PCT Filed: Apr. 13, 2015

(86) PCT No.: PCT/EP2015/057981
§ 371 (c)(1),
(2) Date: Sep. 20, 2017

(87) PCT Pub. No.: WO2016/165737
PCT Pub. Date: Oct. 20, 2016

(65) Prior Publication Data
US 2018/0070234 A1  Mar. 8, 2018

(51) Int. Cl.
*H04W 12/06* (2009.01)
*H04L 29/06* (2006.01)
(Continued)

(52) U.S. Cl.
CPC ............ *H04W 12/06* (2013.01); *H04L 63/08* (2013.01); *H04W 12/04* (2013.01); *H04L 63/06* (2013.01);
(Continued)

(58) Field of Classification Search
CPC ..... H04W 12/06; H04W 12/04; H04W 12/12; H04W 8/02
(Continued)

(56) References Cited

U.S. PATENT DOCUMENTS

| 8,935,763 B2 | 1/2015 | Barriga et al. |
| 2007/0086591 A1* | 4/2007 | Blom .................. H04L 63/0435 380/279 |

FOREIGN PATENT DOCUMENTS

| DE | 102006043340 A1 | 1/2008 |
| EP | 1713289 A1 | 10/2006 |

(Continued)

OTHER PUBLICATIONS

Huawei, "A proposal for IMS AKA and GBA combination in IMS network", ETSI TISPAN #7, Jul. 11-15, 2005, pp. 1-4, 07 TD 171.

*Primary Examiner* — Sam Bhattacharya
(74) *Attorney, Agent, or Firm* — Coats & Bennett, PLLC

(57) ABSTRACT

This relates to wireless communications, and in particular to the generation of keying material for security purposes. In particular, A method of performing authentication for a user terminal. The method comprises performing an Authentication and Key Agreement procedure for authenticating the user terminal in a cellular access network, wherein a core network of the cellular network comprises a Home Subscriber Server; determining in a Bootstrapping Server Function that the user terminal requires keying material for use outside the cellular access network. The method also comprises transferring authentication information directly from the Home Subscriber Server to the Bootstrapping Server Function; and generating session keys in the Bootstrapping Server Function using said authentication information, wherein said session keys are also generated in the user terminal.

18 Claims, 17 Drawing Sheets

(51) Int. Cl.
*H04W 12/04* (2009.01)
*H04W 4/70* (2018.01)
*H04W 12/08* (2009.01)

(52) U.S. Cl.
CPC .............. *H04L 63/10* (2013.01); *H04W 4/70* (2018.02); *H04W 12/08* (2013.01)

(58) Field of Classification Search
USPC ................. 455/410, 411; 370/254; 380/270
See application file for complete search history.

(56) References Cited

FOREIGN PATENT DOCUMENTS

| | | |
|---|---|---|
| WO | 2007042345 A1 | 4/2007 |
| WO | 2007062882 A2 | 6/2007 |

* cited by examiner

1201 — In response to a determination by a Bootstrapping Server Function that the user terminal requires keying material for use outside the cellular access network, transfer authentication information directly from the Home Subscriber Server to the Bootstrapping Server Function, such that session keys can be generated in the Bootstrapping Server Function using said authentication information, and wherein said session keys are also generated in the user terminal

Figure 12

1301 — Determine that the user terminal requires keying material for use outside the cellular access network 1303 — Notify a Bootstrapping Server Function that the user terminal requires keying material for use outside the cellular access network 1305 — Generate session keys for use outside the cellular access network, wherein said session keys are also generated in the user terminal

WIRELESS COMMUNICATIONS

TECHNICAL FIELD

This relates to wireless communications, and in particular to the generation of keying material for security purposes.

BACKGROUND

The Cellular Internet of Things (CIoT) is a new radio technology that is able to provide extended coverage for harsh environments, for example, basements. It is designed to be able to serve a large number of user equipments, for example over 50,000 per base station using a limited bandwidth, for example, 160 bps. The current assumption in 3GPP standardization is that the security mechanism for CIoT would be based on UMTS Authentication and Key Agreement (AKA), however, extending the security deeper into the core network remains as an open issue. The ITU-T Generic Bootstrapping Architecture (GBA) has been presented as one alternative solution. However, the limited available bandwidth and the number of terminals that may be served by one base station mean that the amount of signaling required for GBA presents difficulties in use.

SUMMARY

According to an aspect there is provided a method of performing authentication for a user terminal. The method comprising performing an Authentication and Key Agreement procedure for authenticating the user terminal in a cellular access network, wherein a core network of the cellular network comprises a Home Subscriber Server; determining in a Bootstrapping Server Function that the user terminal requires keying material for use outside the cellular access network. The method also comprises transferring authentication information directly from the Home Subscriber Server to the Bootstrapping Server Function; and generating session keys in the Bootstrapping Server Function using said authentication information, wherein said session keys are also generated in the user terminal.

The method may also comprise notifying the Bootstrapping Server Function from a node in a visited network that the user terminal requires keying material for use outside the cellular access network; the Bootstrapping Server Function identifying the user terminal to the Home Subscriber Server; and the Home Subscriber Server transferring authentication vectors directly to the Bootstrapping Server Function in response thereto.

The node in the visited network may be an Access Security Management Entity.

The method may also comprise notifying the Bootstrapping Server Function from the node in a visited network via a Home Network edge proxy.

In some embodiments the method comprises; sending a notification to the Home Subscriber Server from the node in the visited network via the Home Network edge proxy that the user terminal requires authentication outside the cellular access network; returning said notification from the Home Subscriber Server to the Home Network edge proxy; and notifying the Bootstrapping Server Function from the Home Network edge proxy that the user terminal requires authentication outside the cellular access network.

The method may further comprise: in an Access Security Management Entity node of a visited network, determining that the user terminal requires keying material for use outside the cellular access network; and sending a request to a home network that said Bootstrapping Server Function generate said session keys, wherein the request includes a serving network identity.

The method may further comprise using said serving network identity in a key derivation function in the Bootstrapping Server Function and in the user terminal to create said session keys.

In some embodiments the method comprises returning said session keys to the Access Security Management Entity node of the visited network from the Bootstrapping Server Function.

The method may comprise determining, in the Access Security Management Entity node of the visited network, that the user terminal requires keying material for use outside the cellular access network based on an indication sent by the user terminal.

The Access Security Management Entity node of the visited network may include in said request a first value for a lifetime of said session keys.

The Bootstrapping Server Function may return a second value for the lifetime of said session keys to the Access Security Management Entity.

The Access Security Management Entity may determine a final value for the lifetime of said session keys, based on said first value and/or said second value.

The Bootstrapping Server Function may return a key identifier for said session keys to the Access Security Management Entity. The user terminal and the Bootstrapping Server Function may use a predetermined lifetime for said session keys.

The predetermined lifetime may be configured by an over-the-air configuration mechanism.

The user terminal may generate a key identifier for said session keys based on an address of the Bootstrapping Server Function.

According to a further aspect there is provided a method of performing authentication for a user terminal. The method comprising: performing an Authentication and Key Agreement procedure for authenticating the user terminal in a cellular access network, wherein a core network of the cellular network comprises a Home Subscriber Server; and determining in the Home Subscriber Server that the user terminal requires keying material for use outside the cellular access network. The method further comprises notifying a Bootstrapping Server Function from the Home Subscriber Server that the user terminal requires keying material for use outside the cellular access network; and generating session keys for use outside the cellular access network in the Home Subscriber Server, wherein said session keys are also generated in the user terminal.

The method may further comprise notifying the Home Subscriber Server from a node in a visited network that the user terminal requires keying material for use outside the cellular access network; and the Home Subscriber Server identifying the user terminal to the Bootstrapping Server Function and transferring keying information from said Authentication and Key Agreement procedure directly to the Bootstrapping Server Function.

In some embodiments, the Bootstrapping Server Function has previously subscribed the user terminal to the Home Subscriber Server.

The method may further comprise: in an Access Security Management Entity node of a visited network, determining that the user terminal requires keying material for use outside the cellular access network; and sending a request to a home network that said Home Subscriber Server generate said session keys, wherein the request includes a serving network identity.

The method may comprise using said serving network identity in a key derivation function in the Home Subscriber Server and in the user terminal to create said session keys. The method may comprise returning said session keys to the Access Security Management Entity node of the visited network from the Home Subscriber Server.

In some embodiments the method further comprises determining, in the Access Security Management Entity node of the visited network, that the user terminal requires keying material for use outside the cellular access network based on an indication sent by the user terminal.

The Access Security Management Entity node of the visited network may include in said request a first value for a lifetime of said session keys.

The Bootstrapping Server Function may return a second value for the lifetime of said session keys to the Access Security Management Entity. The Access Security Management Entity may determine a final value for the lifetime of said session keys, based on said first value and said second value. The Bootstrapping Server Function may return a key identifier for said session keys to the Access Security Management Entity. The user terminal and the Bootstrapping Server Function may use a predetermined lifetime for said session keys. The predetermined lifetime may be configured by an over-the-air configuration mechanism.

The user terminal may generate a key identifier for said session keys based on an address of the Bootstrapping Server Function.

According to a further aspect there is provided a method of performing authentication for a user terminal, wherein an Authentication and Key Agreement procedure is performed for authenticating the user terminal in a cellular access network, and wherein a core network of the cellular network comprises a Home Subscriber Server. The method comprises, in a Bootstrapping Server Function: determining that the user terminal requires keying material for use outside the cellular access network; receiving authentication information directly from the Home Subscriber Server; and generating session keys using said authentication information, wherein said session keys are also generated in the user terminal.

The method may further comprise, in the Bootstrapping Server Function: receiving a notification from a node in a visited network that the user terminal requires keying material for use outside the cellular access network; identifying the user terminal to the Home Subscriber Server; and receiving authentication vectors directly from the Home Subscriber Server in response thereto.

The node in the visited network may be an Access Security Management Entity.

The method may further comprise, in the Bootstrapping Server Function: receiving a request to generate said session keys, wherein the request includes a serving network identity; and using said serving network identity in a key derivation function to create said session keys.

In some embodiments the method comprises returning said session keys to an Access Security Management Entity node of the visited network.

In some embodiments, wherein said request includes a first value for the lifetime of said session keys, the method further comprises returning a second value for the lifetime of said session keys to the Access Security Management Entity.

The method may comprise returning a key identifier for said session keys to the Access Security Management Entity.

According to a further aspect there is provided a method of performing authentication for a user terminal, wherein an Authentication and Key Agreement procedure is performed for authenticating the user terminal in a cellular access network, and wherein a core network of the cellular network comprises a Home Subscriber Server. The method comprises, in a Bootstrapping Server Function:
receiving notification from the Home Subscriber Server that the user terminal requires keying material for use outside the cellular access network, wherein the Home Subscriber Server generates session keys for use outside the cellular access network, and wherein said session keys are also generated in the user terminal.

The method may further comprise receiving from the Home Subscriber Server identification of the user terminal and keying information from said Authentication and Key Agreement procedure.

The Bootstrapping Server Function may have previously subscribed the user terminal to the Home Subscriber Server.

An Access Security Management Entity node of the visited network may include in a request a first value for a lifetime of said session keys. The Bootstrapping Server Function may return a second value for the lifetime of said session keys to the Access Security Management Entity. The Bootstrapping Server Function may return a key identifier for said session keys to the Access Security Management Entity.

According to a further aspect there is provided a method of performing authentication for a user terminal, wherein an Authentication and Key Agreement procedure is performed for authenticating the user terminal in a cellular access network, and wherein a core network of the cellular network comprises a Home Subscriber Server, The method comprises, in the Home Subscriber Server: in response to a determination by a Bootstrapping Server Function that the user terminal requires keying material for use outside the cellular access network, transferring authentication information directly from the Home Subscriber Server to the Bootstrapping Server Function, such that session keys can be generated in the Bootstrapping Server Function using said authentication information, and wherein said session keys are also generated in the user terminal.

The authentication information may comprise authentication vectors.

The method may further comprise; receiving a notification in the Home Subscriber Server from a node in the visited network via a Home Network edge proxy that the user terminal requires keying material for use outside the cellular access network; and returning said notification from the Home Subscriber Server to the Home Network edge proxy, such that the Home Network edge proxy can notify the Bootstrapping Server Function that the user terminal requires authentication outside the cellular access network.

According to a further aspect there is provided a method of performing authentication for a user terminal, wherein an Authentication and Key Agreement procedure is performed for authenticating the user terminal in a cellular access network, and wherein a core network of the cellular network comprises a Home Subscriber Server. The method comprises, in the Home Subscriber Server: determining that the user terminal requires keying material for use outside the cellular access network; notifying a Bootstrapping Server Function that the user terminal requires keying material for use outside the cellular access network; and generating session keys for use outside the cellular access network, wherein said session keys are also generated in the user terminal.

The method may comprise in the Home Subscriber Server: receiving a notification from a node in a visited network that the user terminal requires keying material for use outside the cellular access network; and identifying the user terminal to the Bootstrapping Server Function and transferring keying information from said Authentication and Key Agreement procedure directly to the Bootstrapping Server Function.

An Access Security Management Entity node of a visited network may determine that the user terminal requires keying material for use outside the cellular access network; and may send a request to a home network that said Home Subscriber Server generate said session keys, wherein the request includes a serving network identity. The method may comprise; using said serving network identity in a key derivation function in the Home Subscriber Server to create said session keys.

The method may comprise returning said session keys to the Access Security Management Entity node of the visited network from the Home Subscriber Server.

According to a further aspect there is provided a method of performing authentication for a user terminal, wherein an Authentication and Key Agreement procedure is performed for authenticating the user terminal in a cellular access network, and wherein a core network of the cellular network comprises a Home Subscriber Server. The method comprises, in a node in a visited network: determining that the user terminal requires keying material for use outside the cellular access network; and notifying the Bootstrapping Server Function that the user terminal requires keying material for use outside the cellular access network, such that the Bootstrapping Server Function requests authentication information from the Home Subscriber Server, and such that the Bootstrapping Server Function generates session keys in the Bootstrapping Server Function using said authentication information, wherein said session keys are also generated in the user terminal.

The node in the visited network may be an Access Security Management Entity.

The method may comprise notifying the Bootstrapping Server Function from the node in the visited network via a Home Network edge proxy.

The method may further comprise; in the Access Security Management Entity node of a visited network, determining that the user terminal requires keying material for use outside the cellular access network; and sending a request to a home network that said Bootstrapping Server Function generate said session keys, wherein the request includes a serving network identity.

In some embodiments the method comprises receiving returned session keys from the Bootstrapping Server Function.

The method may comprise determining, in the Access Security Management Entity node of the visited network, that the user terminal requires keying material for use outside the cellular access network based on an indication sent by the user terminal.

The Access Security Management Entity node of the visited network may include in said notification to the Bootstrapping Server Function a first value for a lifetime of said session keys.

The method may comprise receiving from the Bootstrapping Server Function a returned second value for the lifetime of said session keys.

The Access Security Management Entity may determine a final value for the lifetime of said session keys, based on said first value and/or said second value. The Access Security Management Entity may receive from the Bootstrapping Server Function a returned key identifier for said session keys.

According to a further aspect there is provided a method of performing authentication for a user terminal, wherein an Authentication and Key Agreement procedure is performed for authenticating the user terminal in a cellular access network, and wherein a core network of the cellular network comprises a Home Subscriber Server. The method comprises, in a node in a visited network: determining that the user terminal requires keying material for use outside the cellular access network; and notifying the Home Subscriber Server that the user terminal requires keying material for use outside the cellular access network, such that the Home Subscriber Server notifies a Bootstrapping Server Function that the user terminal requires keying material for use outside the cellular access network, identifying the user terminal to the Bootstrapping Server Function and transferring keying information from said Authentication and Key Agreement procedure directly to the Bootstrapping Server Function; and such that the Home Subscriber Server generates session keys for use outside the cellular access network, wherein said session keys are also generated in the user terminal.

The node of the visited network may be an Access Security Management Entity node. The method may further comprise: sending a request to a home network that said Home Subscriber Server generate said session keys, wherein the request includes a serving network identity.

The method may further comprise receiving returning session keys in the Access Security Management Entity node from the Home Subscriber Server.

The method may further comprise determining, in the Access Security Management Entity node of the visited network, that the user terminal requires keying material for use outside the cellular access network based on an indication sent by the user terminal.

The Access Security Management Entity node of the visited network may include in said request a first value for a lifetime of said session keys.

The method may comprise receiving in the Access Security Management Entity a returned second value for the lifetime of said session keys.

The method may further comprise, in the Access Security Management Entity, determining a final value for the lifetime of said session keys, based on said first value and said second value.

In some embodiments the method comprises, in the Access Security Management Entity receiving from the Bootstrapping Server Function a key identifier for said session keys.

According to a further aspect there is provided a communications network for performing authentication for a user terminal. The communications network adapted to: perform an Authentication and Key Agreement procedure for authenticating the user terminal in a cellular access network, wherein a core network of the cellular network comprises a Home Subscriber Server; determine in a Bootstrapping Server Function that the user terminal requires keying material for use outside the cellular access network; transfer authentication information directly from the Home Subscriber Server to the Bootstrapping Server Function; and generate session keys in the Bootstrapping Server Function using said authentication information, wherein said session keys are also generated in the user terminal.

According to a further aspect there is provided a communications network for performing authentication of a user terminal. The communications network adapted to: perform an Authentication and Key Agreement procedure to authenticate the user terminal in a cellular access network, wherein a core network of the cellular network comprises a Home Subscriber Server; determine in the Home Subscriber Server that the user terminal requires keying material for use outside the cellular access network; notify a Bootstrapping Server Function from the Home Subscriber Server that the user terminal requires keying material for use outside the cellular access network; and generate session keys for use outside the cellular access network in the Home Subscriber Server, wherein said session keys are also generated in the user terminal.

According to a further aspect there is provided a Bootstrapping Server Function for performing authentication for a user terminal, wherein the user terminal is authenticated in a cellular access network by an Authentication and Key Agreement procedure, and wherein a core network of the cellular network comprises a Home Subscriber Server. The Bootstrapping Server Function being adapted to: determine that the user terminal requires keying material for use outside the cellular access network; receive authentication information directly from the Home Subscriber Server; and generate session keys using said authentication information, wherein said session keys are also generated in the user terminal.

According to a further aspect there is provided a Bootstrapping Server Function for performing authentication for a user terminal, wherein an Authentication and Key Agreement procedure is performed for authenticating the user terminal in a cellular access network, and wherein a core network of the cellular network comprises a Home Subscriber Server. The Bootstrapping Server Function being adapted to: receive notification from the Home Subscriber Server that the user terminal requires keying material for use outside the cellular access network, wherein the Home Subscriber Server generates session keys for use outside the cellular access network, and wherein said session keys are also generated in the user terminal.

According to a further aspect there is provided a Bootstrapping Server Function for performing authentication for a user terminal, wherein an Authentication and Key Agreement procedure is performed for authenticating the user terminal in a cellular access network, and wherein a core network of the cellular network comprises a Home Subscriber Server. The Bootstrapping Server Function comprising a processor and a memory, the memory containing instructions executable by the processor, such that the Bootstrapping Server Function is operable to: receive notification from the Home Subscriber Server that the user terminal requires keying material for use outside the cellular access network, wherein the Home Subscriber Server generates session keys for use outside the cellular access network, and wherein said session keys are also generated in the user terminal.

According to a further aspect there is provided a Bootstrapping Server Function for performing authentication for a user terminal, wherein an Authentication and Key Agreement procedure is performed for authenticating the user terminal in a cellular access network, and wherein a core network of the cellular network comprises a Home Subscriber Server. The Bootstrapping Server Function comprising a processor and a memory, the memory containing instructions executable by the processor, such that the Bootstrapping Server Function is operable to: determine that the user terminal requires keying material for use outside the cellular access network; receive authentication information directly from the Home Subscriber Server; and generate session keys using said authentication information, wherein said session keys are also generated in the user terminal.

According to a further aspect there is provided a Home Subscriber Server for performing authentication for a user terminal, wherein an Authentication and Key Agreement procedure is performed for authenticating the user terminal in the cellular access network. The Home Subscriber Server being adapted to: in response to a determination by a Bootstrapping Server Function that the user terminal requires keying material for use outside the cellular access network, transfer authentication information directly from the Home Subscriber Server to the Bootstrapping Server Function, such that session keys can be generated in the Bootstrapping Server Function using said authentication information, and wherein said session keys are also generated in the user terminal.

According to a further aspect there is provided a Home Subscriber Server for performing authentication for a user terminal, wherein an Authentication and Key Agreement procedure is performed for authenticating the user terminal in the cellular access network. The Home Subscriber Server being adapted to: determine that the user terminal requires keying material for use outside the cellular access network; notify a Bootstrapping Server Function that the user terminal requires keying material for use outside the cellular access network; and generate session keys for use outside the cellular access network, wherein said session keys are also generated in the user terminal.

According to a further aspect there is provided a Home Subscriber Server for performing authentication for a user terminal, wherein an Authentication and Key Agreement procedure is performed for authenticating the user terminal in the cellular access network. The Home Subscriber Server comprising a processor and a memory, the memory containing instructions executable by the processor, such that the Home Subscriber Server is operable to: in response to a determination by a Bootstrapping Server Function that the user terminal requires keying material for use outside the cellular access network, transfer authentication information directly from the Home Subscriber Server to the Bootstrapping Server Function, such that session keys can be generated in the Bootstrapping Server Function using said authentication information, and wherein said session keys are also generated in the user terminal.

According to a further aspect there is provided a Home Subscriber Server for performing authentication for a user terminal, wherein an Authentication and Key Agreement procedure is performed for authenticating the user terminal in the cellular access network. The Home Subscriber Server comprising a processor and a memory, the memory containing instructions executable by the processor, such that the Home Subscriber Server is operable to: determine that the user terminal requires keying material for use outside the cellular access network; notify a Bootstrapping Server Function that the user terminal requires keying material for use outside the cellular access network; and generate session keys for use outside the cellular access network, wherein said session keys are also generated in the user terminal.

According to a further aspect there is provided a node in a visited network for performing authentication for a user terminal, wherein an Authentication and Key Agreement procedure is performed for authenticating the user terminal in a cellular access network, and wherein a core network of the cellular network comprises a Home Subscriber Server. The node in a visited network being adapted to: determine that the user terminal requires keying material for use outside the cellular access network; and notify the Bootstrapping Server Function that the user terminal requires keying material for use outside the cellular access network, such that the Bootstrapping Server Function requests authentication information from the Home Subscriber Server, and such that the Bootstrapping Server Function generates session keys in the Bootstrapping Server Function using said authentication information, wherein said session keys are also generated in the user terminal.

According to a further aspect there is provided a node in a visited network for performing authentication for a user terminal, wherein an Authentication and Key Agreement procedure is performed for authenticating the user terminal in a cellular access network, and wherein a core network of the cellular network comprises a Home Subscriber Server. The node in a visited network being adapted to: determine that the user terminal requires keying material for use outside the cellular access network; and notify the Home Subscriber Server that the user terminal requires keying material for use outside the cellular access network, such that the Home Subscriber Server notifies a Bootstrapping Server Function that the user terminal requires keying material for use outside the cellular access network, identify the user terminal to the Bootstrapping Server Function and transfer keying information from said Authentication and Key Agreement procedure directly to the Bootstrapping Server Function; and such that the Home Subscriber Server generates session keys for use outside the cellular access network, wherein said session keys are also generated in the user terminal.

According to a further aspect there is provided a node in a visited network for performing authentication for a user terminal, wherein an Authentication and Key Agreement procedure is performed for authenticating the user terminal in a cellular access network, and wherein a core network of the cellular network comprises a Home Subscriber Server. The node in a visited network comprising a processor and a memory, the memory containing instructions executable by the processor, such that the node in the visited network is operable to: determine that the user terminal requires keying material for use outside the cellular access network; and notify the Bootstrapping Server Function that the user terminal requires keying material for use outside the cellular access network, such that the Bootstrapping Server Function requests authentication information from the Home Subscriber Server, and such that the Bootstrapping Server Function generates session keys in the Bootstrapping Server Function using said authentication information, wherein said session keys are also generated in the user terminal.

According to a further aspect there is provided a node in a visited network for performing authentication for a user terminal, wherein an Authentication and Key Agreement procedure is performed for authenticating the user terminal in a cellular access network, and wherein a core network of the cellular network comprises a Home Subscriber Server. The node in a visited network comprising a processor and a memory, the memory containing instructions executable by the processor, such that the node in the visited network is operable to: determine that the user terminal requires keying material for use outside the cellular access network; and notify the Home Subscriber Server that the user terminal requires keying material for use outside the cellular access network, such that the Home Subscriber Server notifies a Bootstrapping Server Function that the user terminal requires keying material for use outside the cellular access network, identify the user terminal to the Bootstrapping Server Function and transfer keying information from said Authentication and Key Agreement procedure directly to the Bootstrapping Server Function; and such that the Home Subscriber Server generates session keys for use outside the cellular access network, wherein said session keys are also generated in the user terminal.

According to a further aspect there is provided a computer program product comprising a computer readable medium having computer readable code embodied therein, the computer readable code being configured such that, on execution by a suitable computer or processor, the computer or processor is caused to perform the method of according to any of the aspects and embodiments described above.

This has the advantage that, in certain embodiments, all 3GPP access technologies, such as 2G, 3G, and LTE, as well as Wireless Local Area Network (WLAN) access can be used by the user terminal.

Further, in certain embodiments, the signalling that must be performed by the user terminal is reduced, helping to save power in the user terminal.

Further, in certain embodiments, session keys are generated without requiring HTTP authentication.

BRIEF DESCRIPTION OF THE DRAWINGS

FIG. 12 is a flow chart summarizing a method carried out in a Home Subscriber Server.

FIG. 13 is a flow chart summarizing a method carried out in a Home Subscriber Server.

DETAILED DESCRIPTION

This disclosure relates to the use of Authentication and Key Agreement for the access security in a cellular internet of things network. In particular, the invention relates to the use of the AKA to bootstrap the keys to the Generic Bootstrapping Architecture. The keys generated in the lower layers are therefore reused in the upper layers of the architecture.

The keys are then available if an Internet of Things (IoT) user terminal needs to create a second security association, for example with another node in the core network.

The reuse of these keys in the upper layers, i.e. authentication outside the core home network, can be termed vertical Generic Bootstrapping Architecture, vGBA.

Figure 1:
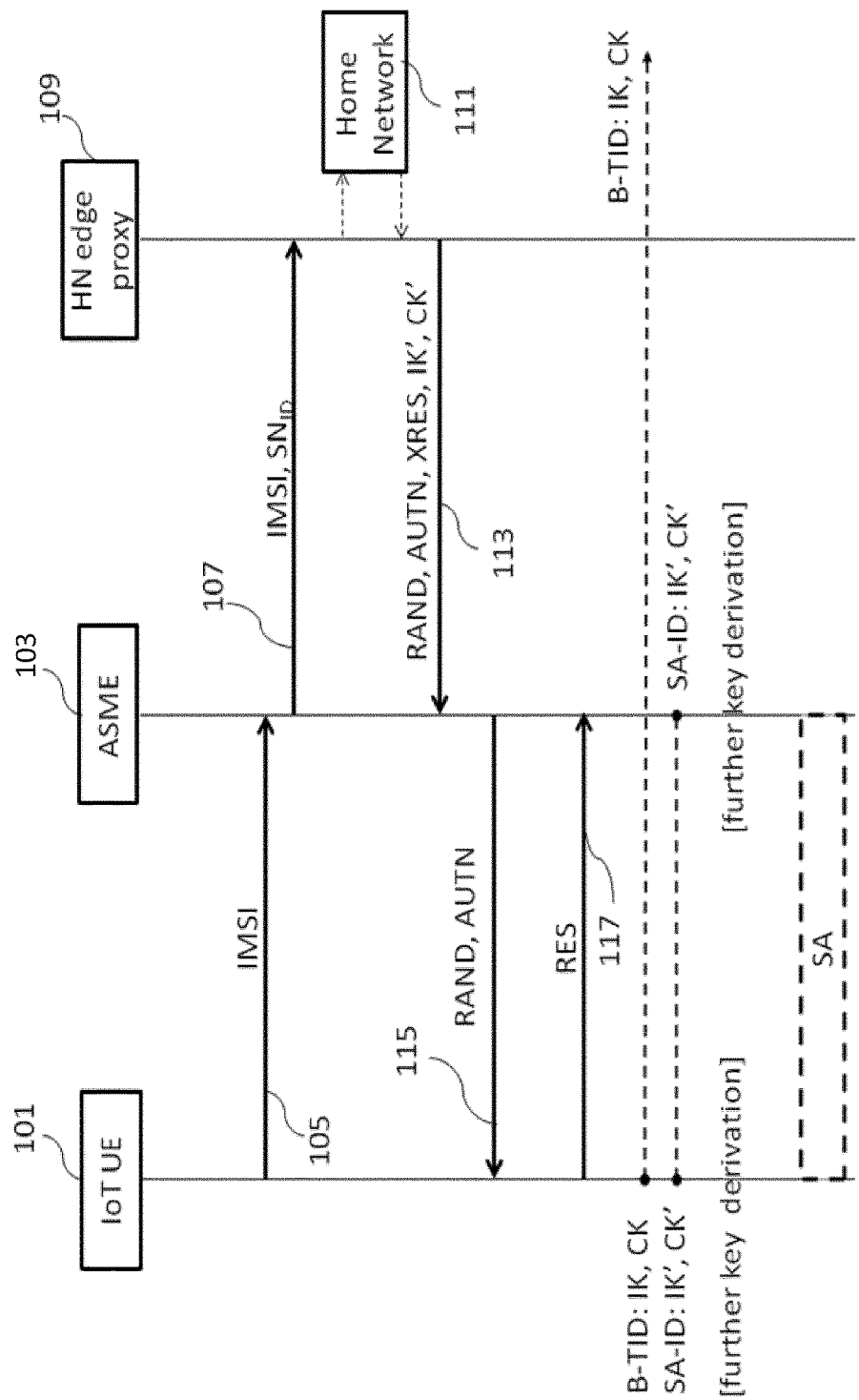
FIG. 1 is a signalling diagram illustrating a first method according an embodiment.

FIG. 1 illustrates the signalling between a user terminal 101, in this example an Internet of Things User Equipment (IoT UE), and a visited network according to some embodiments of the invention. Although various methods are described herein in connection with an IoT UE, which will typically have a low available bandwidth and restricted available battery power, the methods may be used in any terminal device, for example user equipment devices (UEs) in the form of user-operated portable communications devices, such as smartphones, laptop computers or the like; other portable devices, such as tracking devices or the like; or devices that are primarily intended to remain stationary in use, such as sensors, smart meters or the like.

The visited network comprises a node, in this example, an Access Security Management Entity ASME 103 to which the user equipment is requesting connection.

The embodiments of the invention which utilise the signalling illustrated in this figure are transparent to the Access Security Management Entity (ASME) 103 i.e. there is no need to upgrade this node in the visited network in order for the solution to be carried out.

In step 105, the user terminal 101 sends an authentication request to the ASME 103 containing its identity IMSI. The use of vertical Generic Bootstrapping Architecture (GBA) may be subscription based, and thus may be run every time the user terminal 101 authenticates to the network.

In step 107 the ASME 103 forwards the request to a Home Network Edge Proxy (HN) 109 after including the Serving Network Identity $SN_{ID}$ in the request. The $SN_{ID}$ may instead be another ASME related identity which may be used in a key derivation function within a bootstrapping service function in the home network or within the User terminal. In some embodiments, the $SN_{ID}$ may not be available in the forwarded request 107.

The HN 109 may be an entry point to the Home Network of the user terminal 101. It may support, for example, Diameter, Radius or MAP protocols.

In step 111 the HN 109 forwards the request to the home network and receives a response. Further details of the signalling which take place within the home network are described later with reference to FIGS. 2 and 3.

In step 113 an authentication challenge received from a home network of the user terminal 101 is sent from the HN 109 to the ASME 103. This request may include a Authentication and Key Agreement (AKA) challenge. However, instead of the integrity Key, IK and Cipher Key, CK, the AKA challenge may include keys IK' and CK' which are cryptographically created from the original AKA challenge keys IK and CK, respectively, as described in more detail below.

In this way the visited network is not able to guess the original keys IK and CK, and the communication between the user terminal 101 and the HN 109 can remain confidential.

The cryptographic relation between IK/CK and IK'/CK' may be related to the $SN_{ID}$ parameter, and optionally other parameters which may be used to provide a key derivation function.

In some embodiments there may be some further, application specific, key derivation before the keys can be effectively used for the security association between the user terminal 101 and the ASME 103.

In step 115, the ASME 103 removes any expected authentication result which may have been included in the authentication challenge. The session keys IK' and CK' may also be removed from the received authentication challenge. The remaining AKA challenge parameters, for example, a random challenge parameter, RAND, and an authentication token, AUTN, are forwarded to the user terminal 101.

In some embodiments, the session keys IK' and CK' are identified in the ASME 103 using a key identifier, Security Association Identifier, SA-ID. This SA-ID will be dependent on the security solution which is being used in the access network.

In step 117 the user terminal 101 uses the AKA challenge parameters RAND and AUTN to authenticate the network, and to create the original session keys IK and CK.

The user terminal 101 may also use the RAND parameter to generate a key identifier B-TID for the IK and CK session keys. The lifetime of these keys may be counted from a local static key lifetime parameter which in some embodiments is pre-configured within the user terminal 101.

The user terminal 101 stores the IK and CK session keys with the key identifier B-TID and the key lifetime parameter to be used when communicating with Network Application Functions (NAF).

The user terminal 101 can then use the key derivation function to create the modified session keys IK' and CK' from the original session keys IK and CK. In some embodiments, the parameter $SN_{ID}$ and optionally some other parameters may be used in this encryption. The modified session keys IK' and CK' may then be stored with a key identifier SA-ID.

In some embodiments further, application specific, key derivation may be needed before the keys can be used with the security association between the user terminal 101 and the ASME 103.

Figure 2:
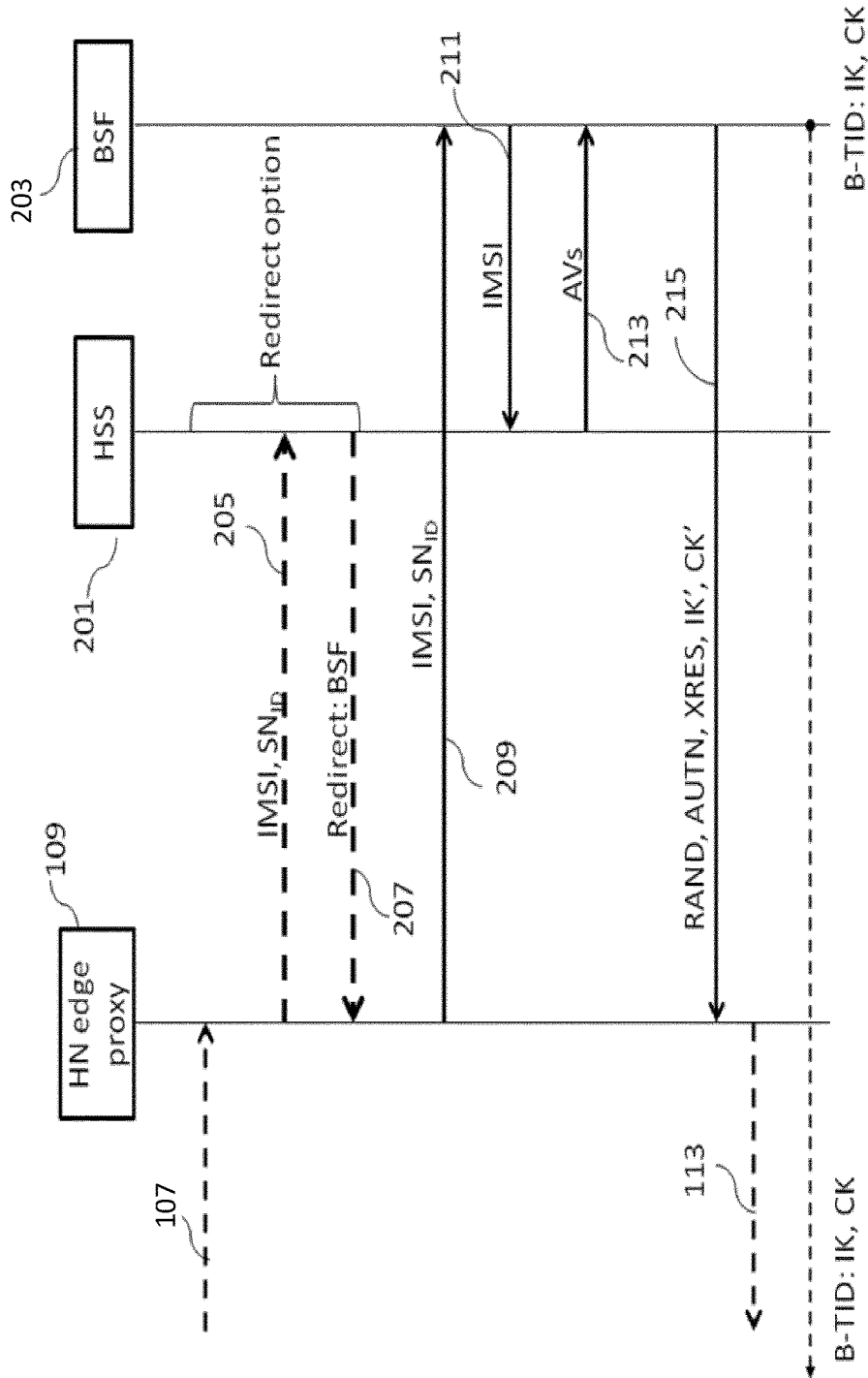
FIG. 2 is a signalling diagram illustrating a second method according an embodiment.

FIG. 2 illustrates an embodiment of the signalling between the Home Network edge proxy node 109 and the Home Network.

This figure illustrates one embodiment of the signalling which can take place in step 111 of FIG. 1.

The Home network is a cellular network which comprises a home network edge proxy (HN) 109 which acts as a gateway to the Home Network. The Home Network also comprises a Home Subscriber Server (HSS) 201, and a Bootstrapping Server Function (BSF) 203.

In particular, this figure illustrates two different approaches. Firstly, the approach where the HSS 201 acts as a re-direction agent. Secondly, the approach where the BSF 203 acts as an authentication proxy.

In the first approach the steps 205 and 207 are carried out additionally to the steps 209, 211, 213 and 215, which are carried out in the second approach.

Hence, when the HSS 201 is acting as a re-direction agent, in step 205 the HN 109 forwards to the HSS 201 a request containing the credentials of the user terminal 101 and the visited serving network, namely the IMSI and $SN_{ID}$ parameter. These credentials may have been received by the HN 109 in step 107 as described in FIG. 1.

The HSS determines that the user terminal 101 is requesting vertical GBA from static subscription data stored in the HSS.

In this embodiment, i.e. when the HSS is acting as a redirection agent, the HSS does not process the request as it must first be routed to the BSF in order for the bootstrapping to take place. The HSS 201 then sends the request back to the Home node 109 in step 207, along with the address of the BSF 203 which is serving the user terminal.

Steps 209, 211, 213 and 215 are the same as the second approach where the BSF 203 is acting as an authentication proxy.

Hence, in step 209, either the HN 109 redirects the initial request 205 to the BSF 203 following steps 205 and 207 in the first approach, or the address of the BSF has already been linked to the IMSI in a static database. In the latter case the HN 109 is able to follow the second approach and forward the request directly to the BSF 203 without being redirected by the HSS 201.

In step 211 the BSF 203 determines that it is required to authenticate the user terminal outside of the home core network, or run vertical GBA, from the static subscription data stored in the BSF. It therefore requests authentication information, or authentication vectors (AVs), from the HSS 201.

In step 213 the HSS 201 transfers the authentication information directly to the BSF and returns the requested AVs to the BSF 203.

In step 215 the BSF 203 generates the session keys to be used between the user terminal 101 and the ASME 103, i.e. the modified keys IK' and CK'. To do this the same procedure as used on the user terminal 101 side is implemented. The original keys IK and CK are stored in the BSF database alongside the key identifier B-TID and the key lifetime. An authentication response is then sent to the HN 109 containing the random parameter RAND, authentication parameter AUTN, the expected response XRES, and the modified keys IK' and CK'.

The Home node 109 may then continue the process on the visited server side as described in FIG. 1 with steps 113, 115 and 117.

Figure 3:
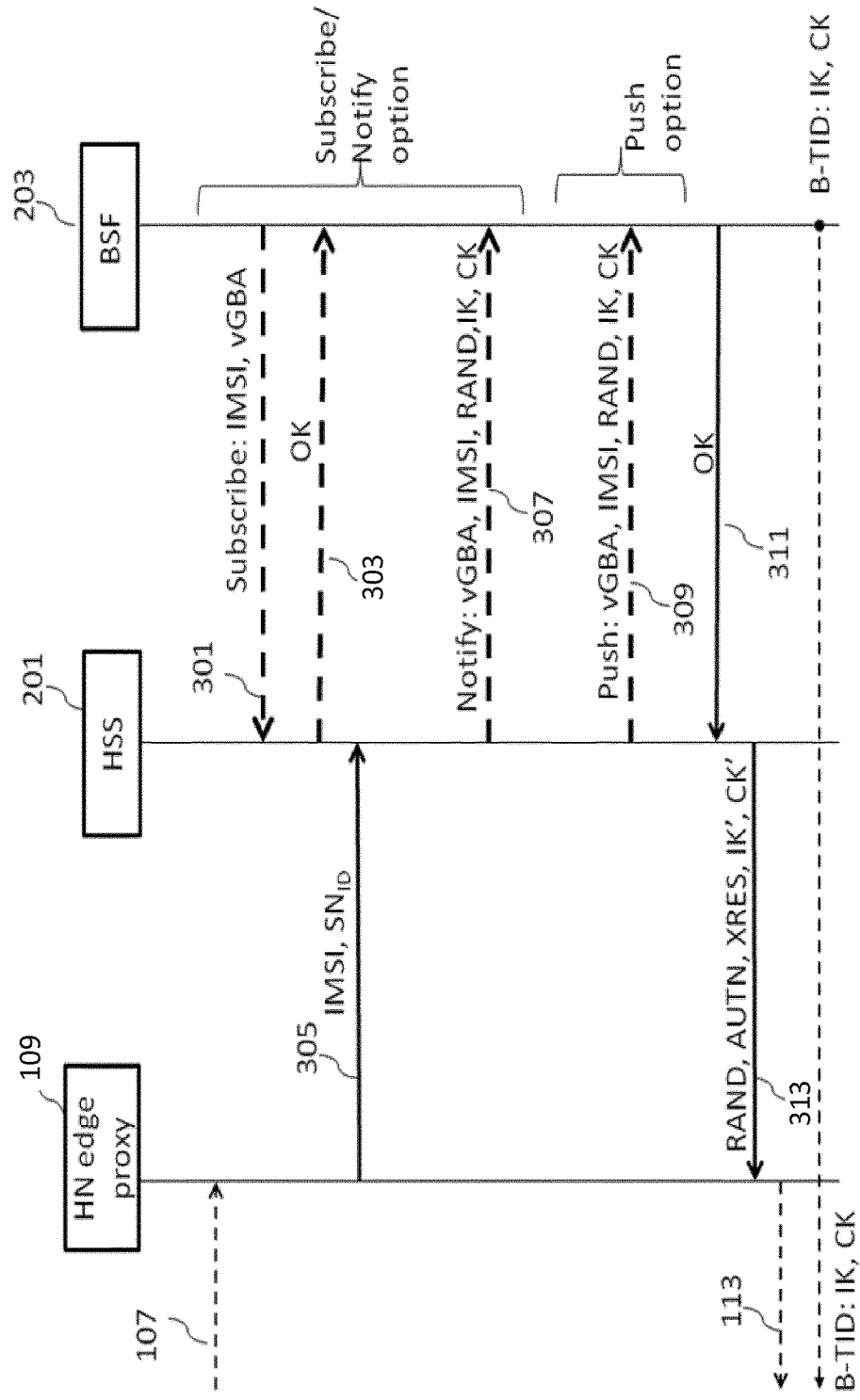
FIG. 3 is a signalling diagram illustrating a third method according an embodiment.

FIG. 3 illustrates one embodiment of the signalling in the Home Core Network.

This figure illustrates a further embodiment of the signalling which can take place in step 111 of FIG. 1. Therefore, this figure is an alternative to the signalling shown in FIG. 2.

Again, FIG. 3 illustrates two different approaches. Firstly, a subscribe and notify approach and secondly a push notification approach.

In this figure the steps 301, 303 and 307 are specific to the first subscribe and notify approach. Step 309 is specific to the push notification approach.

The remaining steps are common to both approaches.

In step 301 of the first approach the BSF 203 sends a subscription request to the HSS 201. This activates the GBA functionality.

In step 303 the HSS 201 responds to the BSF 203 accepting the request to activate the GBA functionality.

These steps act to subscribe the user terminal 101 to the HSS 201 for vGBA functionality.

In step 305, the HSS 201 receives an authentication request forwarded from the HN 109. This request contains the credentials of the user terminal 101 and the visited serving network, for example, the IMSI and $SN_{ID}$ parameter respectively. These credentials may have been received by the HN 109 in step 107 as described in FIG. 1.

The HSS 201 determines that vertical GBA is needed and, in step 307, notifies the BSF 203 that a certain IMSI has now got access to keying material, i.e. IK and CK to be used in bootstrapping for the BSF.

In the second approach, after the authentication request has been received by the HSS 201 in step 305, the HSS 201 determines that vertical GBA is being used from a static entry in database. It therefore provides a push notification 309 to the BSF 203 that a certain IMSI has now gained access to new keying material to be used for bootstrapping in the BSF 203.

In both approaches the RAND parameter may be included in both the notification 307 and push notification 309 as it may be part of the key identifiers used between the user terminal 101 and BSF 203.

After receiving either the notification 307 or the push notification 309, the BSF 203 creates the key identifier, B-TID, from the RAND parameter and the key lifetime. The key lifetime may be derived from a static value stored locally in the BSF 203. The B-TID may then be stored together with the IK and CK original session keys in a local database. The BSF 203 will then return an OK message to the HSS 201 in step 311, indicating that the authentication request has been fulfilled.

In step 313 the HSS 201 uses the key derivation function to create the modified session keys IK' and CK' from the original keys IK and CK. In some embodiments, the $SN_{ID}$ parameter and optionally some other parameters may also be used. These keys are then forwarded to the HN 109 together with the random parameter RAND, authentication parameter AUTN and the expected response XRES.

The HN 109 may then continue the process on the visited server side as described in FIG. 1 with steps 113, 115 and 117.

Figure 4:
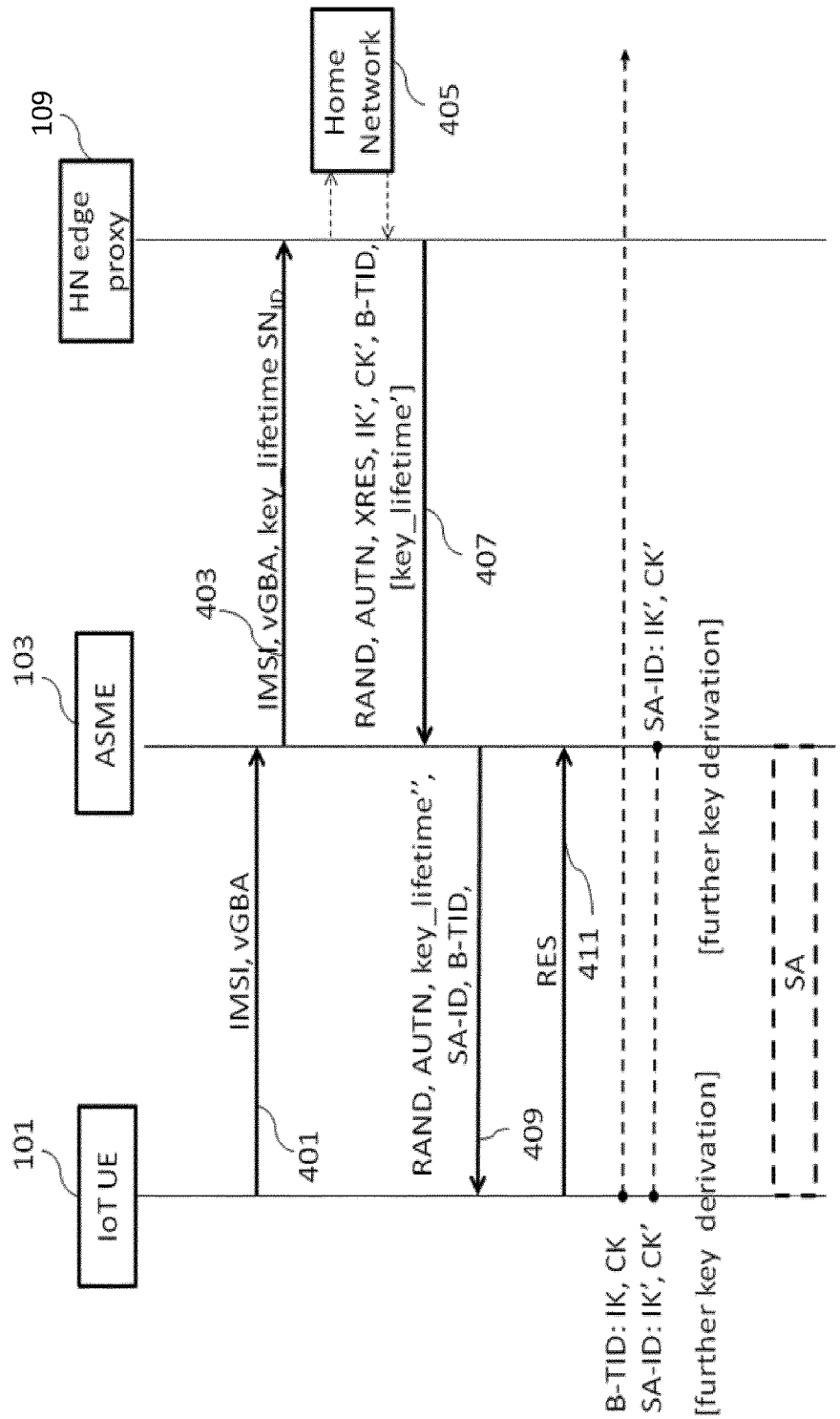
FIG. 4 is a signalling diagram illustrating a fourth method according an embodiment.

FIG. 4 illustrates the signalling between an user terminal, in this example an Internet of Things User Equipment (IoT UE), and a visited network according to some embodiments of the invention. Although various methods are described herein in connection with an IoT UE, which will typically have a low available bandwidth and restricted available battery power, the methods may be used in any terminal device, for example user equipment devices (UEs) in the form of user-operated portable communications devices, such as smartphones, laptop computers or the like; other portable devices, such as tracking devices or the like; or devices that are primarily intended to remain stationary in use, such as sensors, smart meters or the like.

The network in this figure comprises at least the same features as the network in FIG. 1. Similar entities have been given the same reference numerals.

In step 401, the user terminal 101 sends an authentication request to the ASME 103 containing its identity IMSI. This authentication request may also include an indication that it intends to run vertical GBA.

In Step 403 the ASME 103 determines that the user terminal 101 wants to run vertical GBA, and forwards the request to a HN 109 after including the Serving Network Identity $SN_{ID}$ in the request. The $SN_{ID}$ may instead be another ASME related identity which may be used in the key derivation function in the bootstrapping service function of the home network and the user terminal 101 to create modified session keys IK' and CK'. In some embodiments, the $SN_{ID}$ may not be available in the forwarded request 107. In this embodiment, the ASME 103 also includes the key lifetime in the request.

The HN 109 may be an entry point to the Home Network authentication infrastructure of the User terminal. It may support, for example, Diameter, Radius or MAP protocols.

In step 405 the HN 109 forwards the authentication request to the home network, and receives a response. Further details of the signalling which take places within the home network are described later with reference to FIGS. 5 and 6.

In Step 407 an authentication challenge received from a home network of the user terminal 101 is sent from the HN 109 to the ASME 103. This request may include an Authentication and Key Agreement (AKA) challenge. However, instead of the integrity Key, IK and Cipher Key, CK, the AKA challenge may include modified session keys IK' and CK', which are cryptographically created from the original AKA keys IK and CK, respectively, as described in more detail below. In this way the visited network is not able to guess the original keys IK and CK, and the communication between the user terminal 101 and the home network node 109 can remain confidential.

The cryptographic relation between IK/CK and IK'/CK' may be related to the $SN_{ID}$ parameter, and optionally other parameters which may be used to provide a key derivation function.

In some embodiments there may be some further, application specific, key derivation before the keys can be effectively used for the security association between the user terminal 101 and the ASME 103.

In some embodiments a key_lifetime' parameter may also be present in the authentication challenge 407. In this case, the key_lifetime parameter is negotiated between the ASME 103 and the BSF 203. The key_lifetime parameter provided in step 403 is interpreted as the longest lifetime that is acceptable for the ASME 103. However, the key_lifetime' parameter may still be shorter if the BSF 203 in the home network determines that it is possible to have a shorter lifetime.

If the key_lifetime' parameter is not present in the authentication challenge 407, the ASME 103 dictates the key lifetime for all keys, and the BSF 203 in the home network does not take part in the negotiating of these times.

In step 409, the ASME 103 removes any expected authentication result which may have been included in the authentication challenge. The session keys IK' and CK' may also be removed from the from the received authentication challenge. The remaining AKA challenge parameters, for example, a random challenge parameter, RAND, an authentication token, AUTN, and B-TID are forwarded to the user terminal 101.

The parameter key_lifetime" in this response 409 may be generated in different ways. If the key_lifetime' parameter is present in step 407, then key_lifetime" may be set equal to key_lifetime'.

If the key_lifetime' parameter is not present in step 407, then the key_lifetime" parameter may be set equal to key_lifetime parameter.

In some embodiments, the session keys IK' and CK' are identified in the ASME 103 using a key identifier, Security Association Identifier, SA-ID. This SA-ID will be dependent on the security solution which is being used in the access network.

In step 411 the user terminal 101 uses the AKA challenge parameters RAND and AUTN to authenticate the network, and to create the original session keys IK and CK.

The user terminal 101 stores the IK/CK with the key identifier B-TID and the key_lifetime" to be used when communicating with Network Application Functions (NAF).

The user terminal 101 can then use the key derivation function to create the encrypted session keys IK' and CK' from the original session keys IK and CK. In some embodiments, the parameter $SN_{ID}$ and optionally other parameters may be used in this encryption. The modified session keys IK' and CK' may then be stored with a key identifier SA-ID.

In some embodiments further, application specific, key derivation may be needed before the keys can be used with the security association between the user terminal and the ASME.

Figure 5:
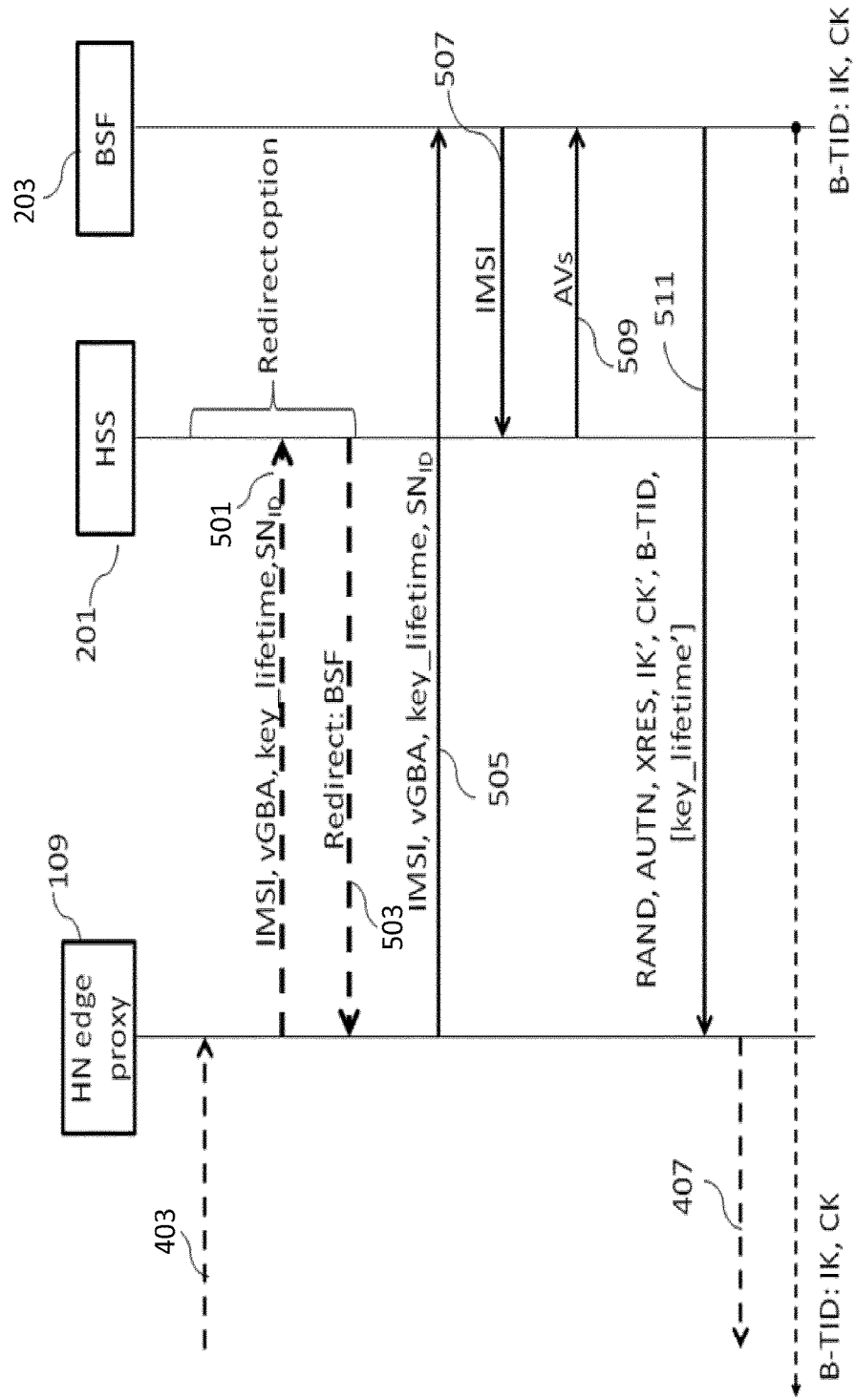
FIG. 5 is a signalling diagram illustrating a fifth method according an embodiment.

FIG. 5 illustrates an embodiment of the signalling between the HN 109 and the Home Network.

This figure illustrates one embodiment of the signalling which can take place in step 405 of FIG. 4.

In particular, this figure illustrates two different approaches. Firstly, the approach where the Home Server Node HSS 201 acts as a re-direction agent. Secondly, the approach where the bootstrapping server function BSF 203 acts as an authentication proxy.

In the first approach the steps 501 and 503 are carried out additionally to the steps 505, 507, 509 and 511, which are carried out in the second approach.

Hence, when the HSS 201 is acting as a re-direction agent, in step 501 the HN 109 forwards the request to the HSS 201 containing the credentials of the user terminal 101 and the visited serving network, namely an IMSI and a $SN_{ID}$ parameter. The request may also contain an indication that the user terminal 101 intends to use vertical GBA and the key_lifetime parameter. These parameters may have been received by the HN 109 in step 403 as described in FIG. 4.

The HSS determines that the user terminal 101 is requesting to use vertical GBA from the indication in the request 501.

In this embodiment, i.e. when the HSS 201 is acting as a redirection agent, the HSS 201 does not process the request as it must first be routed to the BSF 203 in order for the bootstrapping to take place. In step 503, the HSS 201 thus sends the request back to the HN 109 along with the address of the BSF 203 which is serving the user terminal 101.

Steps 505, 507, 509 and 511 are the same as the second approach where the BSF 203 is acting as an authentication proxy.

Hence, in step 505, either the HN 109 redirects the initial request 501 to the BSF 203 following steps 501 and 503 in the first approach, or the address of the BSF 203 has already been linked to the IMSI in a static database. In the later case the HN 109 is able to follow the second approach and forward the request directly to the BSF 203 without being redirected by the HSS 201.

In step 507 the BSF 203 determines that it is required to run vertical GBA from the indication in the forwarded request. It therefore requests authentication information, or authentication vectors (AVs) from the HSS 201.

In step 509 the HSS 201 returns the requested AVs to the BSF 203.

In step 511 the BSF 203 generates the keys to be used between the user terminal 101 and the ASME 103, i.e. the modified keys IK' and CK'. To do this the same procedure as used on the user terminal 101 side to generate these modified keys is implemented. The original keys IK and CK are stored in the BSF 203 database alongside the key identifier B-TID and a key_lifetime' parameter. An authentication response is then sent to the HN 109 containing the random parameter RAND, authentication parameter AUTN, the expected response XRES, the modified keys IK' and CK' and the key identifier B-TID.

The response 511 may or may not contain a key_lifetime' parameter.

In some embodiments, if the ASME dictates the key lifetime for all keys, the BSF does not take part in the negotiation of key lifetimes. In this case, the key_lifetime parameter stored by the BSF 203 is the key lifetime of the B-TID, IK and CK keys and no key_lifetime' parameter is included in the response 511.

If the BSF 203 does take part in the key lifetime negotiation, the BSF 203 needs to determine if the key_lifetime parameter received in step 505 is acceptable or too long. If the key_lifetime of step 505 is acceptable, the BSF 203 returns the same length of time in the parameter key_lifetime' in step 511. If the parameter key_lifetime is too long, the BSF 203 returns a shorter time in the parameter key_lifetime' in step 511.

The HN 109 may then continue the process on the visited server side as described in FIG. 4 with steps 407, 409 and 411.

Figure 6:
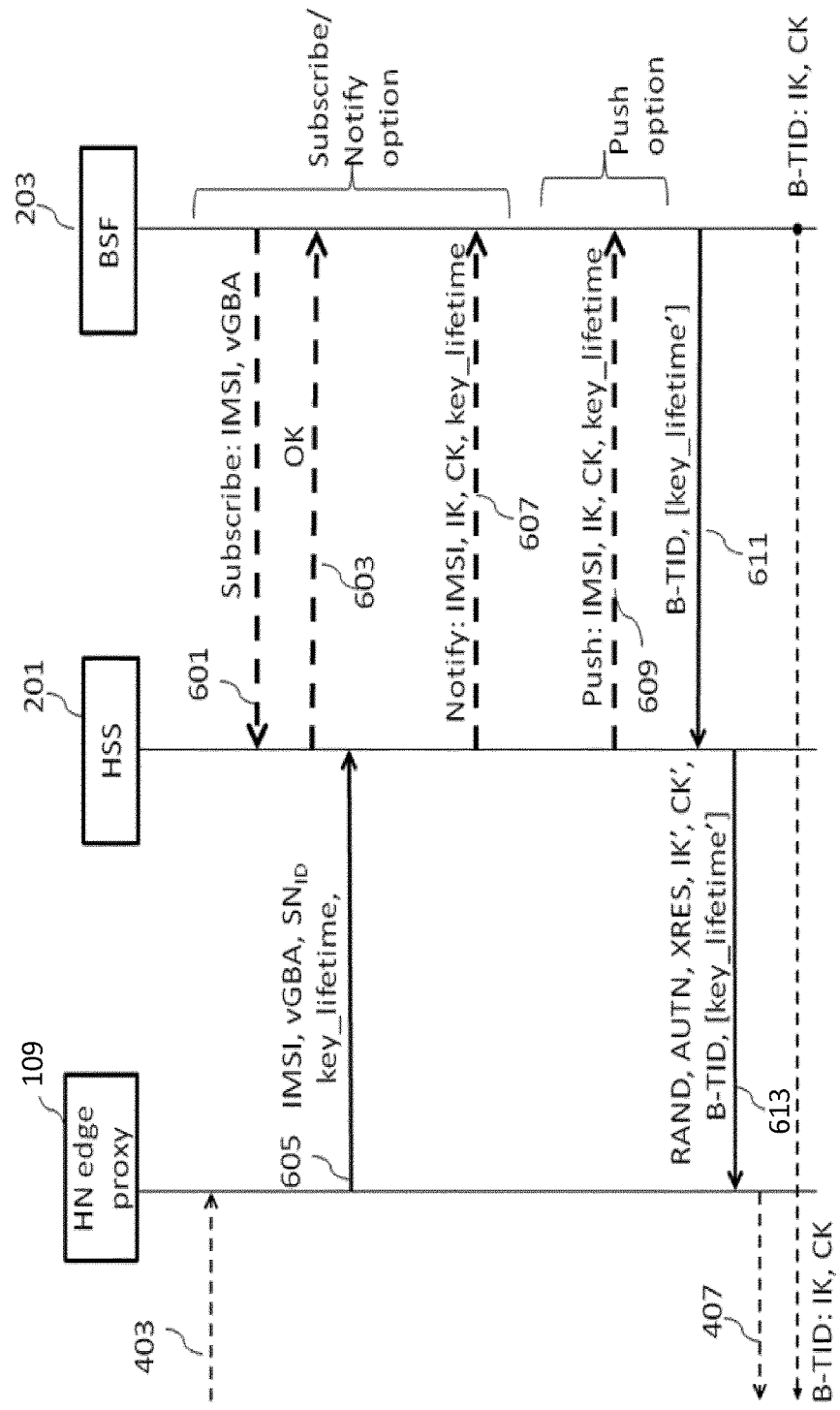
FIG. 6 is a signalling diagram illustrating a sixth method according an embodiment.

FIG. 6 illustrates one embodiment of the signalling in the Home Network.

This figure illustrates a further embodiment of the signalling which can take place in step 405 of FIG. 4. Therefore, this figure is an alternative to the signalling shown in FIG. 5.

Again, FIG. 6 illustrates two different approaches. Firstly, a subscribe and notify approach and secondly a push notification approach.

In this figure the steps 601, 603 and 607 are specific to the first subscribe and notify approach. Step 609 is specific to the push notification approach.

The remaining steps are common to both approaches.

In step 601 of the first approach the BSF 203 sends a subscription request to the HSS 201. This is a request to activate the GBA functionality.

In step 603 the HSS responds to the BSF 203 accepting the request to activate the GBA functionality.

In step 605, the HSS 201 receives an authentication request forwarded from the HN 109. This request contains the credentials of the user terminal 101 and the visited serving network, for example, the IMSI and $SN_{ID}$ parameter respectively, and the parameter key_lifetime. These credentials and parameter may have been received by the HN 109 in step 403 as described in FIG. 4.

The HSS 201 determines that vertical GBA is needed, from the vGBA parameter contained in the request, and, in step 607, notifies the BSF 203 that a certain IMSI has now got access to keying material, i.e. IK and CK to be used in bootstrapping for the BSF 203.

In this embodiment, the notification in step 607 contains the key_lifetime parameter received in the request from the HN 109.

In the second approach, after the authentication request has been received by the HSS 201 in step 605, the HSS 201 determines that vertical GBA is being used from the vGBA parameter in the request. It therefore provides a push notification 609 to the BSF 203 that a certain IMSI has now gained access to new keying material to be used for bootstrapping in the BSF 203.

In both approaches the RAND parameter may be included in the notification 607 or the push notification 609 as the case may be, as it may be part of the key identifiers used between the user terminal 101 and BSF 203.

After receiving either the notification 607 or the push notification 609, the BSF 203 creates the key identifier B-TID. The B-TID may then be stored together with the IK and CK keys and the key_lifetime parameter in a local database. The BSF 203 will then return the B-TID to the HSS 201 in step 611, indicating that the authentication request has been fulfilled.

The response 611 may or may not contain a key_lifetime' parameter.

In some embodiments, if the ASME 103 dictates the key lifetime for all keys, the BSF 203 does not take part in the negotiation of key lifetimes. In this case, the key_lifetime parameter stored by the BSF 203 is the key lifetime of the B-TID, IK and CK keys and no key_lifetime' parameter is included in the response 611.

If the BSF 203 does take part in the key lifetime negotiation, the BSF 203 needs to determine if the key_lifetime parameter received in step 605 is acceptable or too long.

If the key_lifetime of step 605 is acceptable, the BSF 203 returns the same length of time in the parameter key_lifetime' in step 611. If the parameter key_lifetime is too long, the BSF 203 returns a shorter time in the parameter key_lifetime' in step 611.

In step 613 the HSS 201 uses the key derivation function to create the modified session keys IK' and CK' from the original keys IK and CK, the $SN_{ID}$ parameter and optionally other parameters. These keys are then forwarded to the HN 109 together with the random parameter RAND, authentication parameter AUTN, the expected response XRES, B-TID and in some embodiments the returned key_lifetime' parameter.

The HN 109 may then continue the process on the visited server side as described in FIG. 4 with steps 409, 411 and 413.

Figure 7:
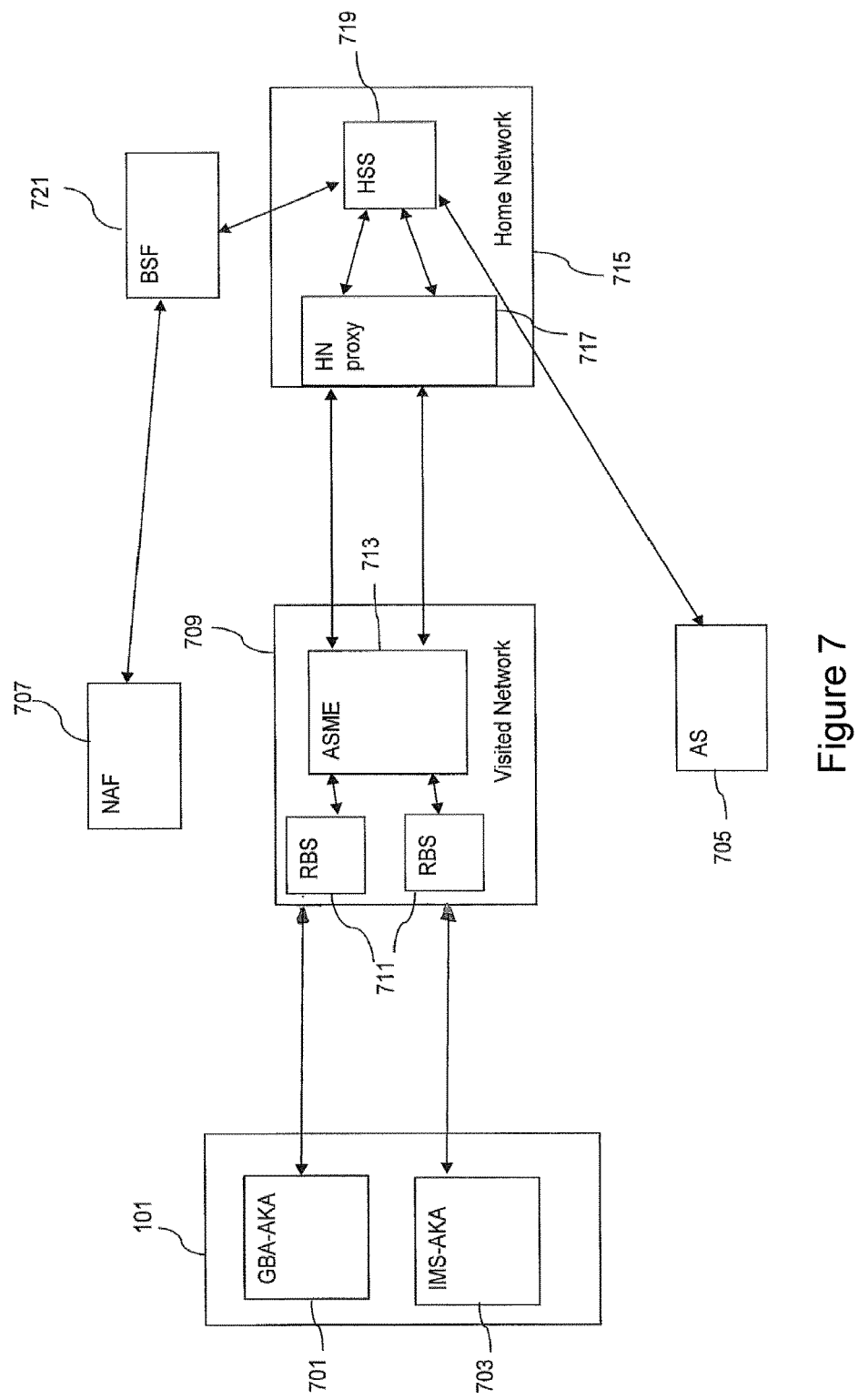
FIG. 7 illustrates a communications network.

FIG. 7 illustrates a communications network according to an embodiment of the invention, as an example of a network in which the methods described above may be performed.

A user terminal 101 comprising both an Internet Protocol Multimedia Subsystem (IMS)-(Authentication and Key Agreement) AKA authentication module 701 and a Generic Bootstrapping Architecture (GBA)-AKA authentication module 703. These may be implemented via secure processing circuitry (hardware and/or software). The IMS-AKA function 701 is used to authenticate the user terminal 101 with one or more IMS applications available from an IMS-based application server, AS 705.

One or more other applications may be available outside or apart from the IMS network's services. These may be accessible by the user terminal 101 via the Network Applications Function (NAF) 707 through the GBA-AKA function.

The user terminal may access either of the application services NAF 707 or AS 705 using an AKA procedure.

A visited network 709, for example a radio access network, comprises radio basestations 711. One or both of the IMS-AKA 701 and the GBA-AKA 703 can connect to the radio access network by means of one of the radio basestations 711.

The basestations are connected to an Access Security Management Entity (ASME) 713.

The visited network may be a radio access network, for example an Evolved UMTS Terrestrial Radio Access Network (E-UTRAN), and in these embodiments, the ASME functionality is carried out by a Mobility Management Entity (MME).

The Home Network 715, which may be a core network, for example, an Evolved Packet Core (EPC) network, comprises a Home Network Edge Proxy (HN) 717. The HN 717 provides a gateway to the Home Network 715.

The Home Network 715 also comprises a Home Subscriber Server HSS 719 which is connected to the HN 717 to receive authentication requests from the user terminal 101, from both the GBA-AKA 701 and GBA-AKA 703.

The HSS 719 is in communication with a Bootstrapping Server Function (BSF) 721 which provides bootstrapping function to associate the keys used for both the NAF 707 application servers and the AS 705 application servers.

Figure 8:
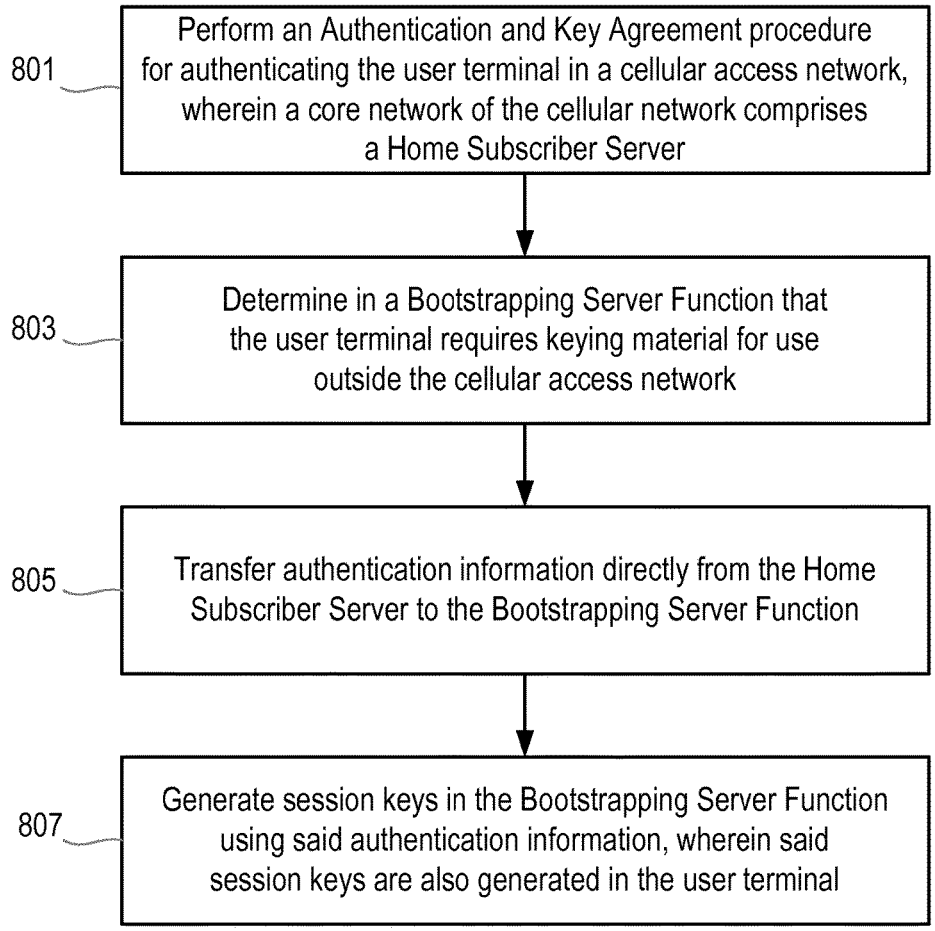
FIG. 8 is a flow chart summarizing a method performed in a communications network.

FIG. 8 is a flow chart summarizing a method performed in a communications network.

In Step 801 an Authentication and Key Agreement procedure is performed for authenticating the user terminal in a cellular access network, wherein a core network of the cellular network comprises a Home Subscriber Server In step 803 a Bootstrapping Server Function determines that the user terminal requires keying material for use outside the cellular access network.

In step 805 authentication information is transferred directly from the Home Subscriber Server to the Bootstrapping Server Function.

In step 807 session keys are generated in the Bootstrapping Server Function using said authentication information, wherein said session keys are also generated in the user terminal.

Figure 9:
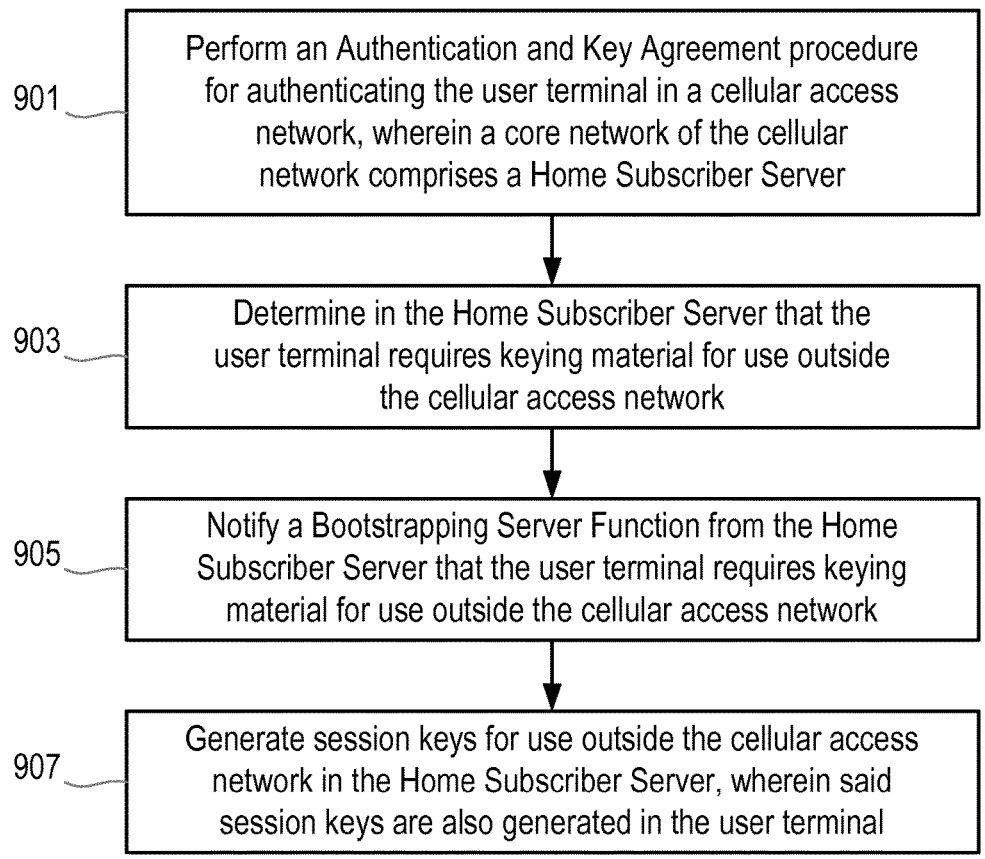
FIG. 9 is a flow chart, summarizing a method performed by a communications network.

FIG. 9 is a flow chart, summarizing a method performed by a communications network.

In step 901 an Authentication and Key Agreement procedure is performed for authenticating the user terminal in a cellular access network, wherein a core network of the cellular network comprises a Home Subscriber Server.

In step 903 determines the Home Subscriber Server determines that the user terminal requires keying material for use outside the cellular access network.

In step 905 a Bootstrapping Server Function is notified from the Home Subscriber Server that the user terminal requires keying material for use outside the cellular access network.

In step 907 session keys are generated for use outside the cellular access network in the Home Subscriber Server, wherein said session keys are also generated in the user terminal.

Figure 10:
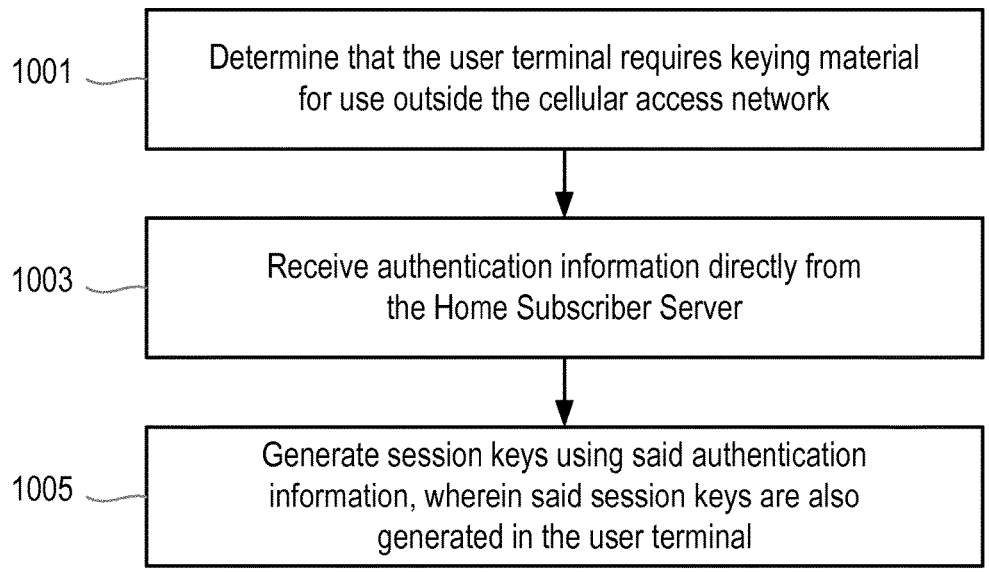
FIG. 10 is a flow chart summarizing a method carried out in a Bootstrapping Server Function.

FIG. 10 is a flow chart summarizing a method carried out in a Bootstrapping Server Function.

In step 1001 the Bootstrapping Server Function determines that the user terminal requires keying material for use outside the cellular access network.

In step 1003 the Bootstrapping Server Function receives authentication information directly from the Home Subscriber Server.

In step 1005 the Bootstrapping Server Function generates session keys using said authentication information, wherein said session keys are also generated in the user terminal.

Figure 11:
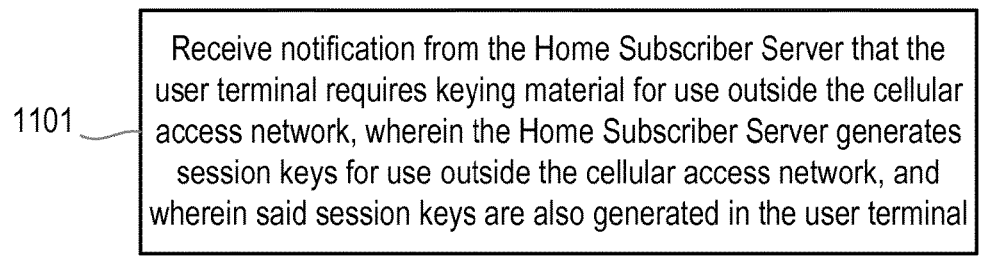
FIG. 11 is a flow chart summarizing a method carried out in a Bootstrapping Server Function.

FIG. 11 is a flow chart summarizing a method carried out in a Bootstrapping Server Function.

In step 1101 the Bootstrapping Server Function receives notification from the Home Subscriber Server that the user terminal requires keying material for use outside the cellular access network, wherein the Home Subscriber Server generates session keys for use outside the cellular access network, and wherein said session keys are also generated in the user terminal.

FIG. 12 is a flow chart summarizing a method carried out in a Home Subscriber Server.

In step 1201 the Home Subscriber Server, in response to a determination by a Bootstrapping Server Function that the user terminal requires keying material for use outside the cellular access network, transfers authentication information directly from the Home Subscriber Server to the Bootstrapping Server Function, such that session keys can be generated in the Bootstrapping Server Function using said authentication information, and wherein said session keys are also generated in the user terminal.

FIG. 13 is a flow chart summarizing a method carried out in a Home Subscriber Server.

In step 1301 the Home Subscriber Server determines that the user terminal requires keying material for use outside the cellular access network.

In step 1303 the Home Subscriber Server notifies a Bootstrapping Server Function that the user terminal requires keying material for use outside the cellular access network.

In step 1305 the Home Subscriber Server generates session keys for use outside the cellular access network, wherein said session keys are also generated in the user terminal.

Figure 14:
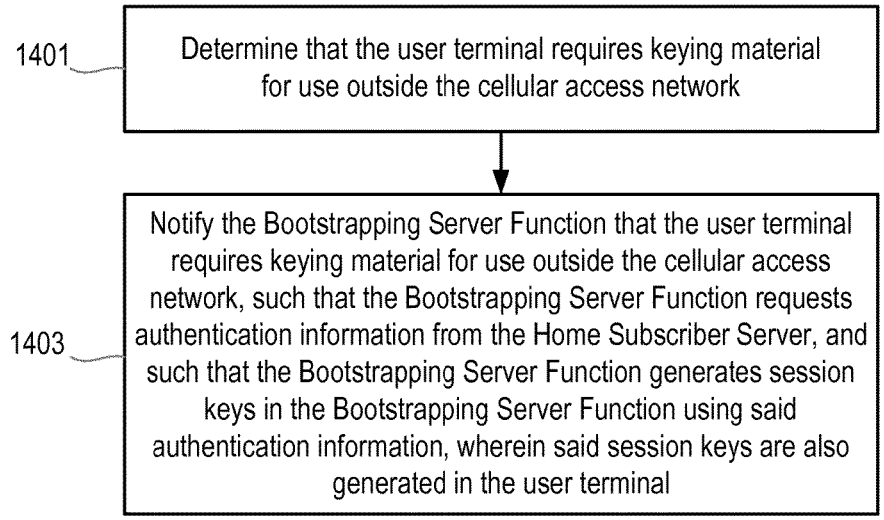
FIG. 14 is a flow chart summarizing a method carried out in a node in a visited network.

FIG. 14 is a flow chart summarizing a method carried out in a node in a visited network.

In step 1401 the node in the visited network determines that the user terminal requires keying material for use outside the cellular access network.

In step 1403 the node in the visited network notify the Bootstrapping Server Function that the user terminal requires keying material for use outside the cellular access network, such that the Bootstrapping Server Function requests authentication information from the Home Subscriber Server, and such that the Bootstrapping Server Function generates session keys in the Bootstrapping Server Function using said authentication information, wherein said session keys are also generated in the user terminal.

Figure 15:
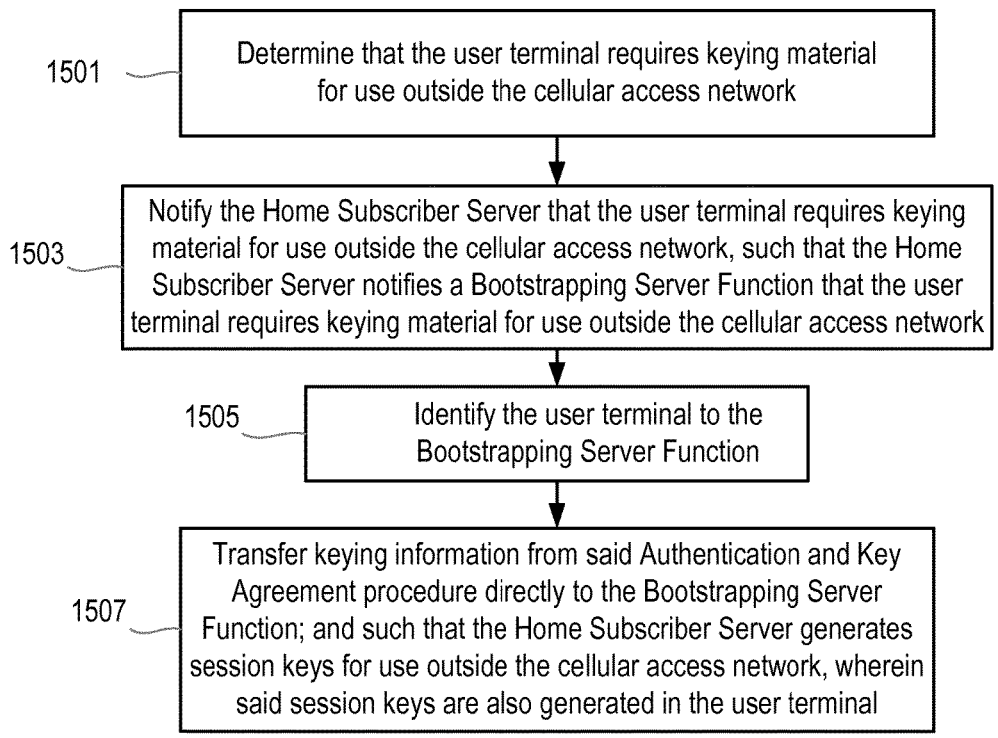
FIG. 15 is a flow chart summarizing a method carried out in a node in a visited network.

FIG. 15 is a flow chart summarizing a method carried out in a node in a visited network.

In step 1501 the node in the visited network determines that the user terminal requires keying material for use outside the cellular access network.

In step 1503 the node in the visited network notifies the Home Subscriber Server that the user terminal requires keying material for use outside the cellular access network, such that the Home Subscriber Server notifies a Bootstrapping Server Function that the user terminal requires keying material for use outside the cellular access network In step 1505 the node in the visited network identifies the user terminal to the Bootstrapping Server Function.

In step 1507 the node in the visited network transfers keying information from said Authentication and Key Agreement procedure directly to the Bootstrapping Server Function; and such that the Home Subscriber Server generates session keys for use outside the cellular access network, wherein said session keys are also generated in the user terminal.

Figure 16:
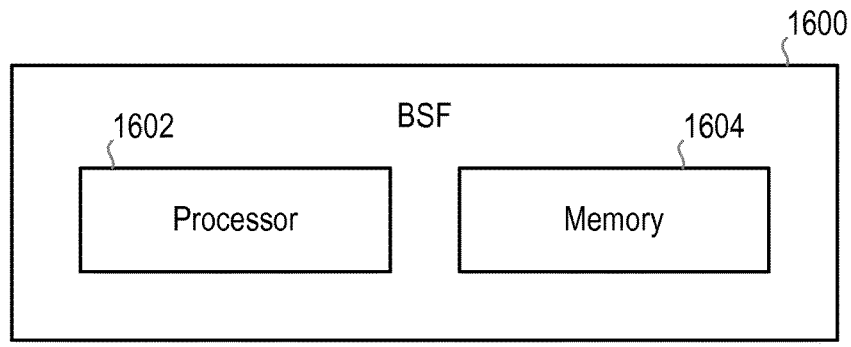
FIG. 16 is a block diagram of a Bootstrapping Server Function.

FIG. 16 illustrates a Bootstrapping Server Function (BSF) 1600, comprising a processor 1602 and a memory 1604. The memory 1604 contains instructions executable by the processor 1602, such that the BSF 1600 is operative to carry out any of the methods described herein, for example the methods shown in FIG. 10 or 11.

Figure 17:
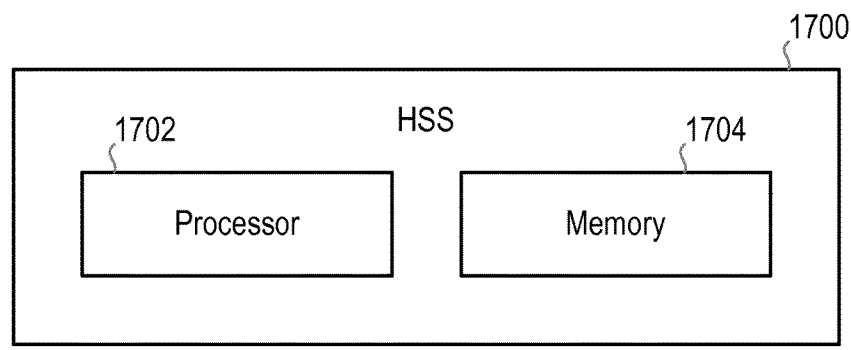
FIG. 17 is a block diagram of a Home Subscriber Server

FIG. 17 illustrates a Home Subscriber Server (HSS) 1700, comprising a processor 1702 and a memory 1704. The memory 1704 contains instructions executable by the processor 1702, such that the HSS 1700 is operative to carry out any of the methods described herein, for example the methods shown in FIG. 12 or 13.

Figure 18:
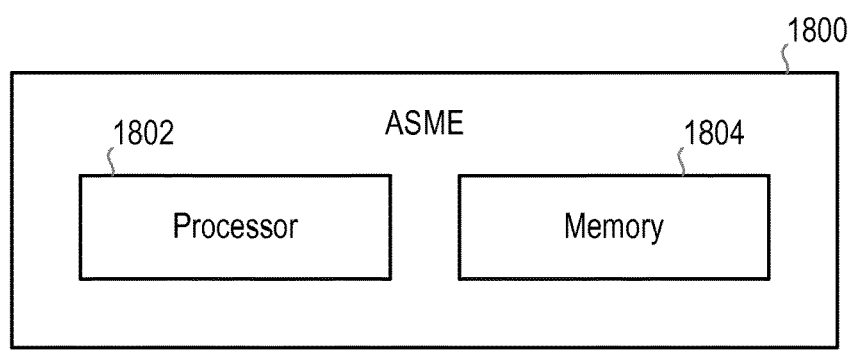
FIG. 18 is a block diagram of a node in a visited network.

FIG. 18 illustrates a node in a visited network, for example an Access Security Management Entity (ASME) 1800, comprising a processor 1802 and a memory 1804. The memory 1804 contains instructions executable by the processor 1802, such that the ASME 1800 is operative to carry out any of the methods described herein, for example the methods shown in FIG. 14 or 15.

Figure 19:
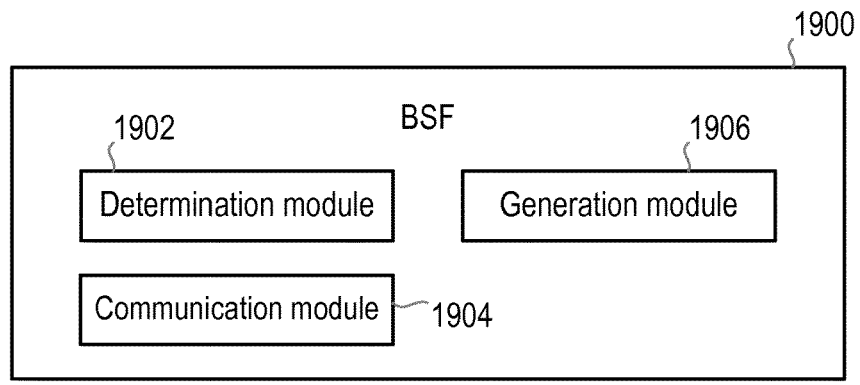
FIG. 19 is a block diagram of a Bootstrapping Server Function.

FIG. 19 illustrates functional units in another embodiment of a BSF 1900 which may execute any of the methods described herein, for example the method shown in FIG. 10, for example according to computer readable instructions received from a computer program. It will be understood that the units illustrated in FIG. 19 are software implemented functional units, and may be realised in any appropriate combination of software modules.

Referring to FIG. 19, the BSF 1900 comprises a determination module 1902 for determining that the user terminal requires keying material for use outside the cellular access network; a communications module 1904 for receiving authentication information directly from the Home Subscriber Server; a generation module 1906 for generating session keys using said authentication information, wherein said session keys are also generated in the user terminal.

Figure 20:
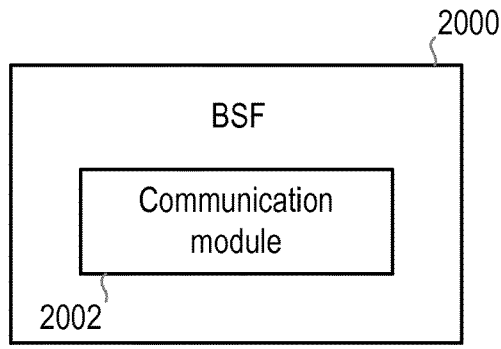
FIG. 20 is a block diagram of a Bootstrapping Server Function.

FIG. 20 illustrates functional units in another embodiment of a BSF 2000 which may execute any of the methods described herein, for example the method shown in FIG. 11, for example according to computer readable instructions received from a computer program. It will be understood that the units illustrated in FIG. 20 are software implemented functional units, and may be realised in any appropriate combination of software modules.

Referring to FIG. 20, the BSF 2000 comprises a communications module 2002 for receiving notification from the Home Subscriber Server that the user terminal requires keying material for use outside the cellular access network, wherein the Home Subscriber Server generates session keys for use outside the cellular access network, and wherein said session keys are also generated in the user terminal.

Figure 21:
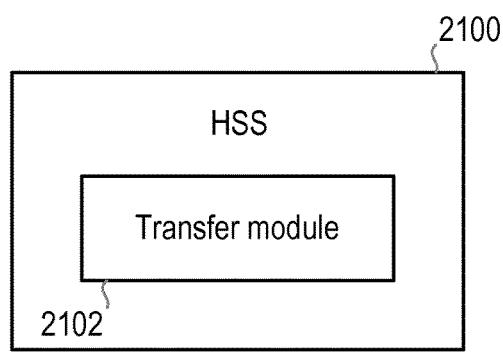
FIG. 21 is a block diagram of a Home Subscriber Server.

FIG. 21 illustrates functional units in another embodiment of a HSS 2100 which may execute any of the methods described herein, for example the method shown in FIG. 12, for example according to computer readable instructions received from a computer program. It will be understood that the units illustrated in FIG. 21 are software implemented functional units, and may be realised in any appropriate combination of software modules.

Referring to FIG. 21, the HSS 2100 comprises a transfer module 2102 for, in response to a determination by a Bootstrapping Server Function that the user terminal requires keying material for use outside the cellular access network, transferring authentication information directly from the Home Subscriber Server to the Bootstrapping Server Function, such that session keys can be generated in the Bootstrapping Server Function using said authentication information, and wherein said session keys are also generated in the user terminal.

Figure 22:
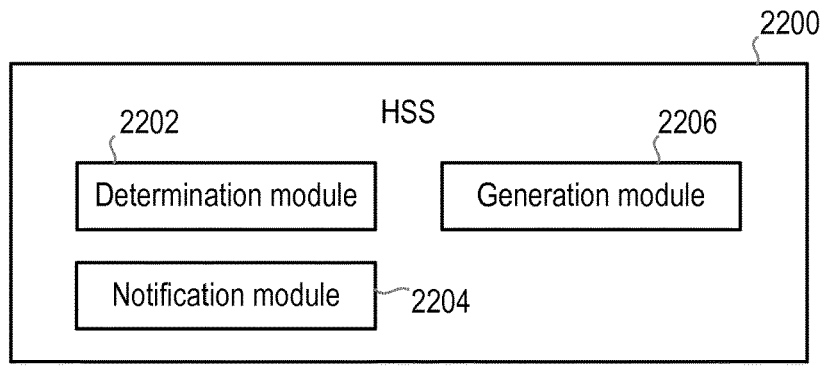
FIG. 22 is a block diagram of a Home Subscriber Server.

FIG. 22 illustrates functional units in another embodiment of a HSS 2200 which may execute any of the methods described herein, for example the method shown in FIG. 13, for example according to computer readable instructions received from a computer program. It will be understood that the units illustrated in FIG. 22 are software implemented functional units, and may be realised in any appropriate combination of software modules.

Referring to FIG. 22, the HSS 2200 comprises a determination module 2202 for, determining that the user terminal requires keying material for use outside the cellular access network; a notification module 2204 for notifying a Bootstrapping Server Function that the user terminal requires keying material for use outside the cellular access network; and a generation module 2206 for generating session keys for use outside the cellular access network, wherein said session keys are also generated in the user terminal.

Figure 23:
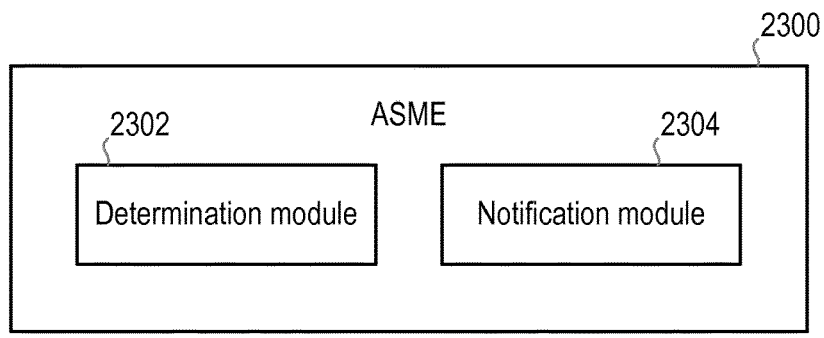
FIG. 23 is a block diagram of a node in a visited network.

FIG. 23 illustrates functional units in another embodiment of a ASME 2300 which may execute any of the methods described herein, for example the method shown in FIG. 14, for example according to computer readable instructions received from a computer program. It will be understood that the units illustrated in FIG. 23 are software implemented functional units, and may be realised in any appropriate combination of software modules.

Referring to FIG. 23, the ASME 2300 comprises a determination module 2302 for, determining that the user terminal requires keying material for use outside the cellular access network; a notification module 2304 for notifying the Bootstrapping Server Function that the user terminal requires keying material for use outside the cellular access network, such that the Bootstrapping Server Function requests authentication information from the Home Subscriber Server, and such that the Bootstrapping Server Function generates session keys in the Bootstrapping Server Function using said authentication information, wherein said session keys are also generated in the user terminal.

Figure 24:
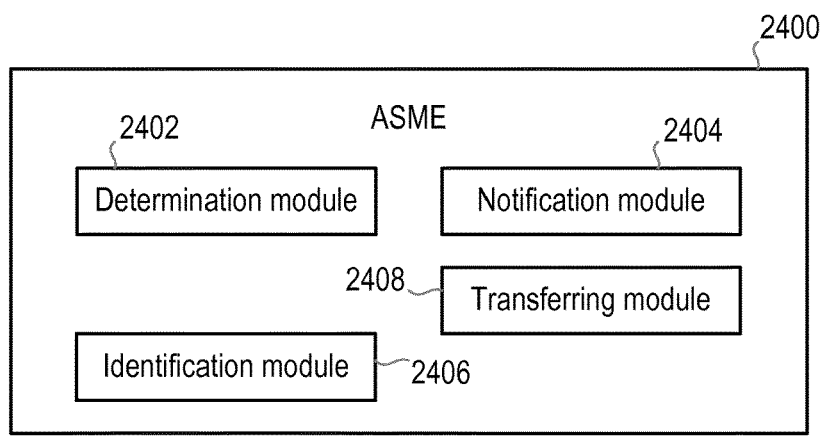
FIG. 24 is a block diagram of a node in a visited network.

FIG. 24 illustrates functional units in another embodiment of a ASME 2400 which may execute any of the methods described herein, for example the method shown in FIG. 15, for example according to computer readable instructions received from a computer program. It will be understood that the units illustrated in FIG. 24 are software implemented functional units, and may be realised in any appropriate combination of software modules.

Referring to FIG. 24, the ASME 2400 comprises a determination module 2402 for, determining that the user terminal requires keying material for use outside the cellular access network; a notification module 2404 for notifying the Home Subscriber Server that the user terminal requires keying material for use outside the cellular access network, such that the Home Subscriber Server notifies a Bootstrapping Server Function that the user terminal requires keying material for use outside the cellular access network; a identification module 2406 for identifying the user terminal to the Bootstrapping Server Function; and a transferring module 2408 for transferring keying information from said Authentication and Key Agreement procedure directly to the Bootstrapping Server Function; and such that the Home Subscriber Server generates session keys for use outside the cellular access network, wherein said session keys are also generated in the user terminal.

Figure 25:
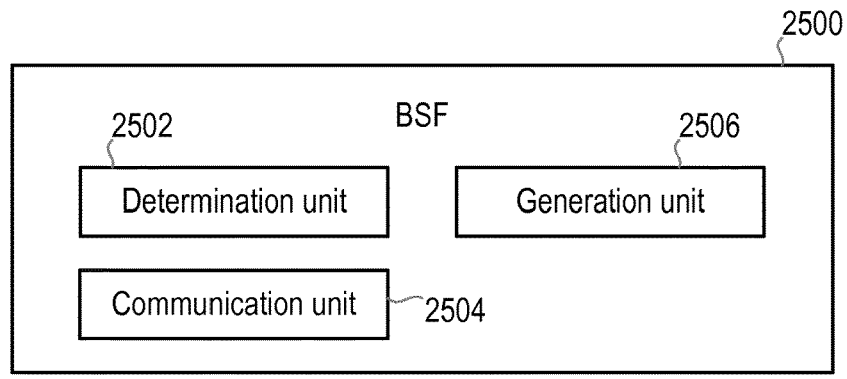
FIG. 25 is a block diagram of a Bootstrapping Server Function.

FIG. 25 illustrates functional units in another embodiment of a BSF 2500 which may execute any of the methods described herein, for example the method shown in FIG. 10, for example according to computer readable instructions received from a computer program. It will be understood that the units illustrated in FIG. 25 are software implemented functional units, and may be realised in any appropriate combination of software modules.

Referring to FIG. 25, the BSF 2500 comprises a determination unit 2502 for determining that the user terminal requires keying material for use outside the cellular access network; a communications unit 2504 for receiving authentication information directly from the Home Subscriber Server; a generation unit 2506 for generating session keys using said authentication information, wherein said session keys are also generated in the user terminal.

Figure 26:
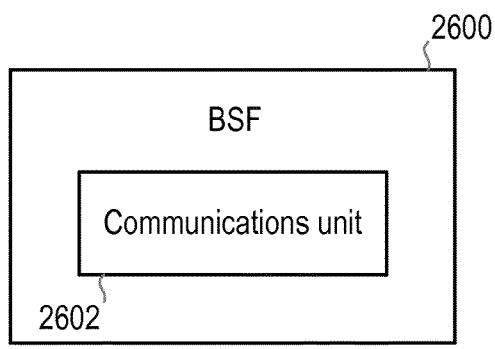
FIG. 26 is a block diagram of a Bootstrapping Server Function.

FIG. 26 illustrates functional units in another embodiment of a BSF 2600 which may execute any of the methods described herein, for example the method shown in FIG. 11, for example according to computer readable instructions received from a computer program. It will be understood that the units illustrated in FIG. 26 are software implemented functional units, and may be realised in any appropriate combination of software modules.

Referring to FIG. 26, the BSF 2600 comprises a communications unit 2602 for receiving notification from the Home Subscriber Server that the user terminal requires keying material for use outside the cellular access network, wherein the Home Subscriber Server generates session keys for use outside the cellular access network, and wherein said session keys are also generated in the user terminal.

Figure 27:
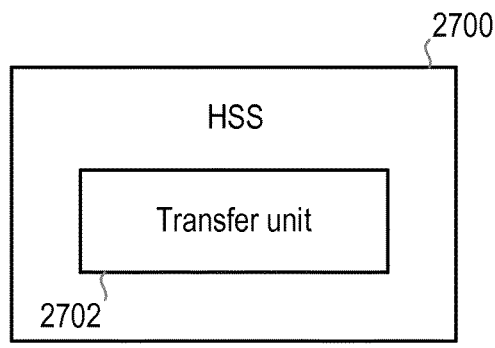
FIG. 27 is a block diagram of a Home Subscriber Server.

FIG. 27 illustrates functional units in another embodiment of a HSS 2700 which may execute any of the methods described herein, for example the method shown in FIG. 12, for example according to computer readable instructions received from a computer program. It will be understood that the units illustrated in FIG. 27 are software implemented functional units, and may be realised in any appropriate combination of software modules.

Referring to FIG. 27, the HSS 2700 comprises a transfer unit 2702 for, in response to a determination by a Bootstrapping Server Function that the user terminal requires keying material for use outside the cellular access network, transferring authentication information directly from the Home Subscriber Server to the Bootstrapping Server Function, such that session keys can be generated in the Bootstrapping Server Function using said authentication information, and wherein said session keys are also generated in the user terminal.

Figure 28:
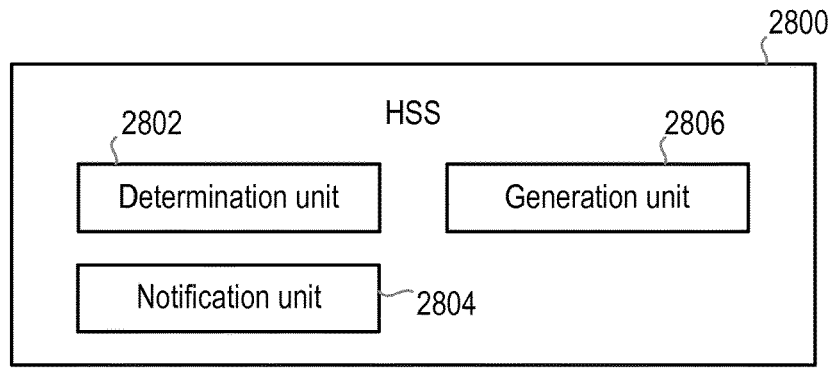
FIG. 28 is a block diagram of a Home Subscriber Server.

FIG. 28 illustrates functional units in another embodiment of a HSS 2800 which may execute any of the methods described herein, for example the method shown in FIG. 13, for example according to computer readable instructions received from a computer program. It will be understood that the units illustrated in FIG. 28 are software implemented functional units, and may be realised in any appropriate combination of software modules.

Referring to FIG. 28, the HSS 2800 comprises a determination unit 2802 for, determining that the user terminal requires keying material for use outside the cellular access network; a notification unit 2804 for notifying a Bootstrapping Server Function that the user terminal requires keying material for use outside the cellular access network; and a generation unit 2806 for generating session keys for use outside the cellular access network, wherein said session keys are also generated in the user terminal.

Figure 29:
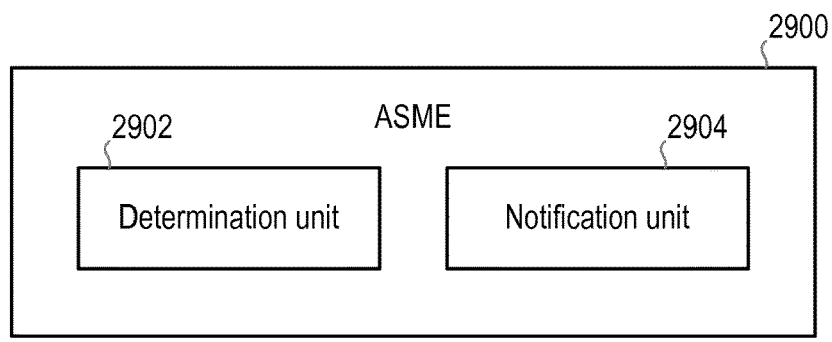
FIG. 29 is a block diagram of a node in a visited network.

FIG. 29 illustrates functional units in another embodiment of a ASME 2900 which may execute any of the methods described herein, for example the method shown in FIG. 14, for example according to computer readable instructions received from a computer program. It will be understood that the units illustrated in FIG. 29 are software implemented functional units, and may be realised in any appropriate combination of software modules.

Referring to FIG. 29, the ASME 2900 comprises a determination unit 2902 for, determining that the user terminal requires keying material for use outside the cellular access network; a notification unit 2904 for notifying the Bootstrapping Server Function that the user terminal requires keying material for use outside the cellular access network, such that the Bootstrapping Server Function requests authentication information from the Home Subscriber Server, and such that the Bootstrapping Server Function generates session keys in the Bootstrapping Server Function using said authentication information, wherein said session keys are also generated in the user terminal.

Figure 30:
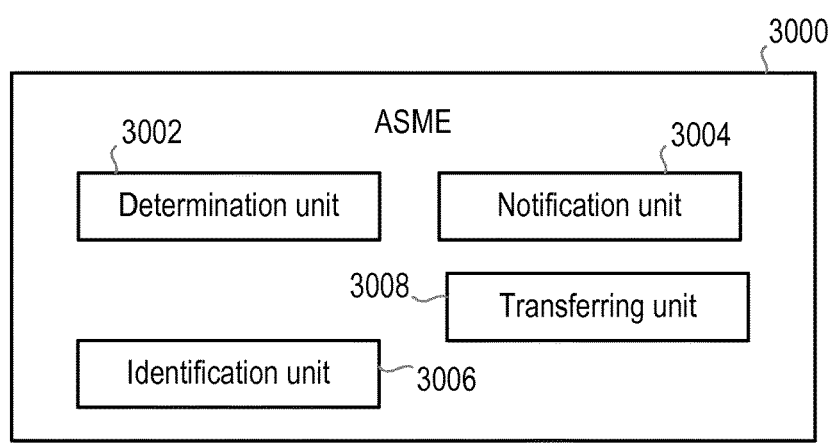
FIG. 30 is a block diagram of a node in a visited network.

FIG. 30 illustrates functional units in another embodiment of a ASME 3000 which may execute any of the methods described herein, for example the method shown in FIG. 15, for example according to computer readable instructions received from a computer program. It will be understood that the units illustrated in FIG. 30 are software implemented functional units, and may be realised in any appropriate combination of software modules.

Referring to FIG. 30, the ASME 3000 comprises a determination unit 3002 for, determining that the user terminal requires keying material for use outside the cellular access network; a notification unit 3004 for notifying the Home Subscriber Server that the user terminal requires keying material for use outside the cellular access network, such that the Home Subscriber Server notifies a Bootstrapping Server Function that the user terminal requires keying material for use outside the cellular access network; a identification unit 3006 for identifying the user terminal to the Bootstrapping Server Function; and a transferring unit 3008 for transferring keying information from said Authentication and Key Agreement procedure directly to the Bootstrapping Server Function; and such that the Home Subscriber Server generates session keys for use outside the cellular access network, wherein said session keys are also generated in the user terminal.

There are thus described methods of performing authentication for a user terminal based on an existing Authentication and Key Agreement procedure.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:
1. A method of performing authentication for a user terminal, the method comprising:
 performing an Authentication and Key Agreement procedure for authenticating the user terminal in a cellular access network, wherein a core network of the cellular access network comprises a Home Subscriber Server;
 determining, in a Bootstrapping Server Function, that the user terminal requires keying material for use outside the cellular access network;
 responsive to the determining, transferring authentication information directly from the Home Subscriber Server to the Bootstrapping Server Function; and
 generating session keys in the Bootstrapping Server Function using the authentication information, wherein the session keys are also generated in the user terminal.

2. The method of claim 1, further comprising:
notifying the Bootstrapping Server Function, from a node in a visited network, that the user terminal requires keying material for use outside the cellular access network;
the Bootstrapping Server Function identifying the user terminal to the Home Subscriber Server; and
the Home Subscriber Server transferring authentication vectors directly to the Bootstrapping Server Function in response thereto.

3. The method of claim 2, wherein the node in the visited network is an Access Security Management Entity.

4. The method of claim 2, further comprising notifying the Bootstrapping Server Function, from the node in a visited network, via a Home Network edge proxy.

5. The method of claim 4, further comprising:
sending a notification to the Home Subscriber Server from the node in the visited network, via the Home Network edge proxy, that the user terminal requires authentication outside the cellular access network;
returning the notification from the Home Subscriber Server to the Home Network edge proxy; and
notifying the Bootstrapping Server Function from the Home Network edge proxy that the user terminal requires authentication outside the cellular access network.

6. The method of claim 1, further comprising:
determining, in an Access Security Management Entity node of a visited network, that the user terminal requires keying material for use outside the cellular access network; and
sending a request to a home network that the Bootstrapping Server Function generate the session keys, wherein the request includes a serving network identity.

7. The method of claim 6, further comprising using the serving network identity in a key derivation function in the Bootstrapping Server Function and in the user terminal to create the session keys.

8. The method of claim 6, further comprising returning the session keys to the Access Security Management Entity node of the visited network from the Bootstrapping Server Function.

9. The method of claim 6, further comprising determining, in the Access Security Management Entity node of the visited network, that the user terminal requires keying material for use outside the cellular access network based on an indication sent by the user terminal.

10. The method of claim 6, wherein the Access Security Management Entity node of the visited network includes, in the request, a first value for a lifetime of the session keys.

11. The method of claim 10, wherein the Bootstrapping Server Function returns a second value for the lifetime of the session keys to the Access Security Management Entity.

12. The method of claim 11, wherein the Access Security Management Entity determines a final value for the lifetime of the session keys, based on the first value and/or the second value.

13. The method of claim 8, wherein the Bootstrapping Server Function returns a key identifier for the session keys to the Access Security Management Entity.

14. The method of claim 1, wherein the user terminal and the Bootstrapping Server Function use a predetermined lifetime for the session keys.

15. The method of claim 14, wherein the predetermined lifetime is configured by an over-the-air configuration mechanism.

16. The method of claim 1, wherein the user terminal generates a key identifier for the session keys based on an address of the Bootstrapping Server Function.

17. A Home Subscriber Server for performing authentication for a user terminal, wherein an Authentication and Key Agreement procedure is performed for authenticating the user terminal in the cellular access network, the Home Subscriber Server comprising:
processing circuitry;
memory containing instructions executable by the processing circuitry whereby the Home Subscriber Server is operative to:
in response to a determination by a Bootstrapping Server Function that the user terminal requires keying material for use outside the cellular access network, transfer authentication information directly from the Home Subscriber Server to the Bootstrapping Server Function, such that session keys can be generated in the Bootstrapping Server Function using the authentication information, and wherein the session keys are also generated in the user terminal.

18. A non-transitory computer readable recording medium storing a computer program product for controlling a computer, the computer program product comprising software instructions which, when run on processing circuitry of the computer, causes the computer to:
perform an Authentication and Key Agreement procedure for authenticating the user terminal in a cellular access network, wherein a core network of the cellular access network comprises a Home Subscriber Server;
determine, in a Bootstrapping Server Function, that the user terminal requires keying material for use outside the cellular access network;
responsive to a determination, in the Bootstrapping Server Function, that the user terminal requires keying material for use outside the cellular access network, transfer authentication information directly from the Home Subscriber Server to the Bootstrapping Server Function; and
generate session keys in the Bootstrapping Server Function using the authentication information, wherein the session keys are also generated in the user terminal.

* * * * *